(12) United States Patent
Hamilton et al.

(10) Patent No.: US 7,653,598 B1
(45) Date of Patent: Jan. 26, 2010

(54) PAYMENT PROCESSING WITH SELECTION OF A PROCESSING PARAMETER

(75) Inventors: Daniel Lee Hamilton, Hilliard, OH (US); William Richard McMichael, Jr., Cumming, GA (US); Esther J. Pigg, Monroe, LA (US); Cathy E. Webber, Atlanta, GA (US); Hans D. Dreyer, Gahanna, OH (US)

(73) Assignee: CheckFree Corporation, Norcross, GA (US)

( * ) Notice: Subject to any disclaimer, the term of this patent is extended or adjusted under 35 U.S.C. 154(b) by 1172 days.

(21) Appl. No.: 10/631,973

(22) Filed: Aug. 1, 2003

(51) Int. Cl.
G06Q 40/00 (2006.01)
(52) U.S. Cl. ............................................. 705/40
(58) Field of Classification Search .............. 705/1–45; 379/123, 144, 225; 702/38; 235/379; 370/465; 209/584; 377/10
See application file for complete search history.

(56) References Cited

U.S. PATENT DOCUMENTS

| | | | |
|---|---|---|---|
| 4,823,264 A | 4/1989 | Deming | |
| 5,025,373 A | 6/1991 | Keyser, Jr. et al. | |
| 5,220,501 A | 6/1993 | Lawlor et al. | |
| 5,283,829 A | 2/1994 | Anderson | |
| 5,326,959 A | 7/1994 | Perazza | |
| 5,336,870 A | 8/1994 | Hughes et al. | |
| 5,383,113 A | 1/1995 | Kight et al. | |
| 5,420,405 A | 5/1995 | Chasek | |
| 5,465,206 A | 11/1995 | Hilt et al. | |
| 5,504,677 A | 4/1996 | Pollin | |
| 5,649,117 A | 7/1997 | Landry | |
| 5,677,955 A | 10/1997 | Doggett et al. | |
| 5,699,528 A | 12/1997 | Hogan | |
| 5,710,889 A | 1/1998 | Clark et al. | |
| 5,727,249 A | 3/1998 | Pollin | |
| 5,794,221 A | 8/1998 | Egendorf | |
| 5,873,072 A | 2/1999 | Kight et al. | |
| 5,884,288 A | 3/1999 | Chang et al. | |
| 5,920,847 A * | 7/1999 | Kolling et al. ................ 705/40 |
| 5,920,848 A | 7/1999 | Schutzer et al. | |
| 5,966,698 A | 10/1999 | Pollin | |
| 5,974,146 A | 10/1999 | Randle et al. | |
| 5,978,780 A * | 11/1999 | Watson ........................ 705/40 |
| 6,029,150 A | 2/2000 | Kravitz | |
| 6,032,133 A | 2/2000 | Hilt et al. | |
| 6,098,053 A | 8/2000 | Slater | |
| 6,188,994 B1 | 2/2001 | Egendorf | |
| 6,311,170 B1 | 10/2001 | Embrey | |

(Continued)

OTHER PUBLICATIONS

Method and device for determining speed value. Fuji Jukogyo Kabushiki Kshishu, Tokyo, Japan, 1995.*

(Continued)

Primary Examiner—Mary Cheung
Assistant Examiner—Tien C Nguyen
(74) Attorney, Agent, or Firm—Sutherland Asbill & Brennan LLP

(57) ABSTRACT

A technique for making a payment to a payee on behalf of a payor is provided. A selection is made, based upon a received payment request, of a processing parameter from a group of processing parameters. The group of processing parameters consists of at least two of three processing parameters. The three processing parameters are a speed of processing, cost of processing, and a risk of processing. The payment is made according to the selected processing parameter.

16 Claims, 17 Drawing Sheets

| # | Debit Option | Risk Analysis Required? | SP DDA at Payor FI | SP DDA at Payee FI | Payee Reversible | Risk Factor (0=none, 9=high) | Speed Factor (0=fast, 9=slow) | Cost Factor (0=min, 9=high) | Credit Options Available | When Can Credit Be Initiated? |
|---|---|---|---|---|---|---|---|---|---|---|
| | Real-time authorization | | | | | | | | | |
| 1A | • Funds to SP DDA at SP FI | N | | | | 3 | 0 | 4 | 3, 4 | +0 |
| 1B | • Funds to SP DDP at SP FI | N | | | ✓ | 1 | 0 | 5 | 3, 4 | +0 |
| 1C | • Funds to SP DDA at *payee's* FI | N | | ✓ | | 3 | 0 | 4 | 2A, 2B | +0 |
| 1D | • Funds to SP DDA at *payee's* FI | N | | ✓ | ✓ | 1 | 0 | 5 | 2A, 2B | +0 |
| | Good funds | | | | | | | | | |
| 2A | • Funds to SP DDA at SP FI | N | | | | 3 | 3 | 0 | 3, 4 | +1 |
| 2B | • Funds to SP DDA at SP FI | N | | | ✓ | 1 | 0 | 1 | 3, 4 | +0 |
| 2C | • Funds to SP DDA at *payee's* FI | N | | ✓ | | 3 | 3 | 0 | 2A, 2B | +1 |
| 2D | • Funds to SP DDA at *payee's* FI | N | | ✓ | ✓ | 1 | 0 | 1 | 2A, 2B | +0 |
| | ACH file to payor FI | | | | | | | | | |
| 3A | • Funds to SP DDA at *payor's* FI | N | ✓ | | | 2 | 3 | 2 | 1A, 1B | +1 |
| 3B | • Funds to SP DDA at *payor's* FI | N | ✓ | | ✓ | 1 | 0 | 3 | 1A, 1B | +0 |
| | ACH file to payee FI | | | | | | | | | |
| 4A | • Funds to SP DDA at *payee's* FI | N | | ✓ | ✓ | 1 | 0 | 5 | 2A, 2B | +0 |
| 4B | • Funds to SP DDA at SP FI | N | | | ✓ | 1 | 0 | 6 | 3, 4 | +0 |
| | 601 | 603 | 605 | 607 | 609 | 611 | 613 | 615 | 617 | 619 | 621 |

U.S. PATENT DOCUMENTS

| | | |
|---|---|---|
| 6,493,685 B1 | 12/2002 | Ensel et al. |
| 6,647,376 B1* | 11/2003 | Farrar et al. .................. 705/45 |
| 6,999,943 B1 | 2/2006 | Johnson et al. |
| 7,127,236 B2 | 10/2006 | Khan et al. |
| 2001/0037295 A1 | 11/2001 | Olsen |
| 2002/0004874 A1 | 1/2002 | Agata et al. |
| 2002/0032651 A1 | 3/2002 | Embrey |
| 2002/0059114 A1* | 5/2002 | Cockrill et al. .............. 705/27 |
| 2002/0087468 A1 | 7/2002 | Ganesan et al. |
| 2002/0087471 A1 | 7/2002 | Ganesan et al. |
| 2002/0116331 A1* | 8/2002 | Cataline et al. .............. 705/39 |
| 2002/0198829 A1 | 12/2002 | Ludwig et al. |
| 2003/0004874 A1* | 1/2003 | Ludwig et al. ................. 705/40 |
| 2003/0191709 A1* | 10/2003 | Elston et al. ................. 705/40 |
| 2004/0019605 A1* | 1/2004 | Keown et al. ........... 707/104.1 |
| 2004/0088251 A1 | 5/2004 | Moenickheim et al. |
| 2004/0215560 A1* | 10/2004 | Amalraj et al. .............. 705/40 |
| 2004/0230526 A1* | 11/2004 | Praisner ...................... 705/40 |
| 2005/0010523 A1* | 1/2005 | Myklebust et al. ........... 705/40 |
| 2005/0021460 A1* | 1/2005 | Teague et al. ................ 705/40 |
| 2005/0222954 A1 | 10/2005 | Keown et al. |
| 2007/0162387 A1* | 7/2007 | Cataline et al. .............. 705/40 |

OTHER PUBLICATIONS

Disclosure Under 37 C.F.R. §1.56.
Non-Final Office Action dated Dec. 31, 2007 for related U.S. Appl. No. 10/631,970, filed Aug. 1, 2003.
Non-Final Office Action dated Jul. 9, 2008 for related U.S. Appl. No. 10/631,971, filed Aug. 1, 2003.
Final Office Action dated May 14, 2008 for related U.S. Appl. No. 10/631,972, filed Aug. 1,2003.
Final Office Action dated Oct. 16, 2008 for related U.S. Appl. No. 10/631,970, filed Aug. 1, 2003.
Non-Final Office Action dated Oct. 30, 2008 for related U.S. Appl. No. 10/1631,972, filed Aug. 1, 2003.
Final Office Action dated Feb. 20, 2009 for related U.S. Appl. No. 10/631,971, filed Aug. 1, 2003.
Non-Final Office Action dated Apr. 15, 2009 for related U.S. Appl. No. 10/631,970, filed Aug. 1, 2003.
Non-Final Office Action dated Apr. 15, 2009 for related U.S. Appl. No. 10/631,972, filed Aug. 1, 2003.

* cited by examiner

FIGURE 6A

| # | Debit Option | Risk Analysis Required? | SP DDA at Payor FI | SP DDA at Payee FI | Payee Reversible | Risk Factor (0=none, 9=high) | Speed Factor (0=fast, 9=slow) | Cost Factor (0=min, 9=high) | Credit Options Available | When Can Credit Be Initiated? |
|---|---|---|---|---|---|---|---|---|---|---|
| | Real-time authorization | | | | | | | | | |
| 1A | • Funds to SP DDA at SP FI | N | | | | 3 | 0 | 4 | 3, 4 | +0 |
| 1B | • Funds to SP DDP at SP FI | N | | | ✓ | 1 | 0 | 5 | 3, 4 | +0 |
| 1C | • Funds to SP DDA at *payee's* FI | N | | ✓ | | 3 | 0 | 4 | 2A, 2B | +0 |
| 1D | • Funds to SP DDA at *payee's* FI | N | | ✓ | ✓ | 1 | 0 | 5 | 2A, 2B | +0 |
| | Good funds | | | | | | | | | |
| 2A | • Funds to SP DDA at SP FI | N | | | | 3 | 3 | 0 | 3, 4 | +1 |
| 2B | • Funds to SP DDA at SP FI | N | | | ✓ | 1 | 0 | 1 | 3, 4 | +0 |
| 2C | • Funds to SP DDA at *payee's* FI | N | | ✓ | | 3 | 3 | 0 | 2A, 2B | +1 |
| 2D | • Funds to SP DDA at *payee's* FI | N | | ✓ | ✓ | 1 | 0 | 1 | 2A, 2B | +0 |
| | ACH file to payor FI | | | | | | | | | |
| 3A | • Funds to SP DDA at *payor's* FI | N | ✓ | | ✓ | 2 | 3 | 2 | 1A, 1B | +1 |
| 3B | • Funds to SP DDA at *payor's* FI | N | ✓ | | ✓ | 1 | 0 | 3 | 1A, 1B | +0 |
| | ACH file to payee FI | | | | | | | | | |
| 4A | • Funds to SP DDA at *payee's* FI | N | | ✓ | ✓ | 1 | 0 | 5 | 2A, 2B | +0 |
| 4B | • Funds to SP DDA at SP FI | N | | | ✓ | 1 | 0 | 6 | 3, 4 | +0 |

| # | Debit Option | Risk Analysis Required? | SP DDA at Payer FI | SP DDA at Payee FI | Payee Reversible | Risk Factor (0=none, 9=high) | Speed Factor (0=fast, 9=slow) | Cost Factor (0=min, 9=high) | Credit Options Available | When Can Credit Be Initiated? |
|---|---|---|---|---|---|---|---|---|---|---|
| 5A-0 | • Funds to SP DDA at *payee's* FI | Y | | ✓ | | 8 | 0 | 4 | 2A, 2B | +0 |
| 5B-0 | • ACH file to Fed<br>• Funds to SP at SP FI | Y | | | | 8 | 0 | 5 | 3, 4 | +0 |
| 5A-1 | • ACH file to payee FI<br>• Funds to SP DDA at *payee's* FI | Y | | ✓ | | 7 | 3 | 4 | 2A, 2B | +1 |
| 5B-1 | • ACH file to Fed<br>• Funds to SP DDA at SP FI | Y | | | | 7 | 3 | 5 | 3, 4 | +1 |
| 5A-2 | • ACH file to payee FI<br>• Funds to SP DDA at *payee's* FI | Y | | ✓ | | 6 | 5 | 4 | 2A, 2B | +2 |
| 5B-2 | • ACH file to Fed<br>• Funds to SP DDA at SP FI | Y | | | | 6 | 5 | 5 | 3, 4 | +2 |
| 5A-3 | • ACH file to payee FI<br>• Funds to SP DDA at *payee's* FI | Y | | ✓ | | 5 | 7 | 4 | 2A, 2B | +3 |
| 5B-3 | • ACH file to Fed<br>• Funds to SP DDA at SP FI | Y | | | | 5 | 7 | 5 | 3, 4 | +3 |
| 6 | Draft | Y | | | | 0 | 9 | 9 | 5 | - |

| # | Credit Option | SP DDA at Payor FI | SP DDA at Payee FI | Paypr FI = Payee FI | Speed Factor (0=fast, 9=slow) | Cost Factor (0=min, 9=high) | When Will Funds Be Available to Payee? |
|---|---|---|---|---|---|---|---|
| 1A | ACH file to payor bank<br>• "On us" at payer bank | ✓ | ✓ | ✓ | 1 | 1 | +0 |
| 1B | ACH file to payor bank<br>• Payer bank originates to Fed | ✓ | | | 5 | 5 | +1 |
| 2A | ACH file to payee bank<br>• "On us" at payee bank | | ✓ | | 1 | 2 | +0 |
| 2B | ACH file to payee bank<br>• Settlement from payor bank required | ✓ | ✓ | | 1 | 4 | +0 |
| 3 | ACH file to Fed | | | | 5 | 6 | +1 |
| 4 | Corporate check | | | | 9 | 8 | - |
| 5 | Draft | | | | 9 | 9 | - |

FIGURE 7

PAYMENT PROCESSING WITH SELECTION OF A PROCESSING PARAMETER

RELATED APPLICATIONS

This application is related to U.S. patent application Ser. No. 10/631,974, filed on Aug. 1, 2003 and entitled "MULTIPLE DISTRIBUTED OPERATING ACCOUNTS"; U.S. patent application Ser. No. 10/631,963 filed on Aug. 1, 2003 and entitled "A TECHNIQUE FOR SELECTION OF A FINANCIAL INSTITUTION AT WHICH TO MAINTAIN AN OPERATING ACCOUNT"; U.S. patent application Ser. No. 10/631,964, filed on Aug. 1, 2003 and entitled "NEW PAYMENT PROCESSING PARAMETERS"; U.S. patent application Ser. No. 10/631,970, filed on Aug. 1, 2003 and entitled "PAYMENT PROCESSING WITH SELECTION OF A RISK REDUCTION TECHNIQUE"; U.S. patent application Ser. No. 10/631,972, filed on Aug. 1, 2003 and entitled "PAYMENT PROCESSING WITH SELECTION OF AN ELECTRONIC DEBITING OPTION"; U.S. patent application Ser. No. 10/631,971, filed on Aug. 1, 2003 and entitled "PAYMENT PROCESSING WITH PAYEE RISK MANAGEMENT"; and U.S. patent application Ser. No. 10/631,969 filed on Aug. 1, 2003 and entitled "DEBIT-CREDIT COMBINATION SELECTION."

FIELD OF THE INVENTION

The present invention relates to electronic commerce, and more particularly to providing an electronic payment service.

BACKGROUND OF THE INVENTION

An electronic payment service provider is an entity that provides the electronic commerce service of completing payment on behalf of a user of the electronic payment service of that service provider. The user on whose behalf a payment is completed is a payor, and an entity receiving the payment (often a biller) is a payee. An enrolled user of service provider is known as a subscriber of the service provider. A subscriber can be an individual, a business, or another type of organization.

A service provider receives a payment request electronically, either directly from subscriber, or from another entity acting on behalf of a subscriber. A payment request, at a minimum, specifies a payee, a payment amount, and a payment date. A payment request may be electronically originated at any one of several electronic user interfaces, including automated telephone system interfaces, Web-based interfaces, PC application-based interfaces, set-top box-based interfaces, ATM-based interfaces, PDA-based interfaces, and mobile phone-based interfaces. A payment request may also be originated by a server system on behalf of a payor.

After receipt of a payment request, a service provider processes the request to initiate payment processing. At the conclusion of payment processing the service provider issues remittance to the payee. Remittance is a combination of a credit to a payee and remittance advice associated with the credit.

A credit accomplishes a transfer of funds to a payee to fulfill a payment request. A credit may be performed through a paper process (check or draft), or an electronic funds transfer (EFT) process. The funds may come directly from a demand deposit account (DDA) associated with a subscriber, e.g., via a draft, or from a demand deposit account associated with the payment service provider. A demand deposit account could be a checking account, a money market account, or any other type financial account in which an account holder can access funds held therein at will. An electronic funds transfer is the process of causing funds to move between different financial accounts, perhaps at the same, or different financial institutions, across one or more networks. A financial institution (FI) is an entity that maintains financial accounts that can be debited and/or credited as a result of transaction activity. Financial institutions include banks, savings and loans, credit unions, and brokerage houses. Networks linking financial institutions, as well as other entities, include the Federal Reserve's Automated Clearinghouse (ACH) network.

The Federal Reserve System is the central bank of the United States of America, formed by an act of Congress. It consists of twelve Reserve Banks located in major cities throughout the United States. The ACH network electronically links the Federal Reserve Banks with financial institutions throughout the United States to support electronic funds transfer between the financial institutions. MasterCard's RPPS network, Visa's ePay network, and Princeton eCom's network are examples of remittance networks, each of which links a service provider with one or more payees.

Remittance advice is a description of a credit that allows proper payment posting to a specific account, or sub-account, in a payee's Accounts Receivable ledger. Remittance advice may be tightly coupled with an instrument used to accomplish the credit (e.g., information printed in a memo field on a check or draft, or information included in a field in an electronic funds transfer file transmitted over a network linking financial institutions), or it may be somewhat decoupled from the credit, such as a paper document delivered to a payee, separate from a credit, or an electronic file transmitted directly to the payee separate from a credit. Remittance advice typically includes at least information identifying a payor, information identifying the payor's account with the payee, and a payment amount.

A managed payee is a payee about whom a service provider has information that enables remittance to that payee to be handled in some improved/optimal fashion. The information typically includes one or more account schemes for improved reliability of Accounts Receivable posting at the managed payee, account ranges for remittance center identification, other information for remittance center identification, payee preferred credit form (e.g., paper or electronic, specific syntax), payee preferred remittance advice form (e.g., paper or electronic, specific syntax), and electronic links for delivery of electronic credits and/or electronic remittance advice.

Managed payee information, collected by a service provider from managed payees and/or other sources, is typically stored in a managed payee database. A managed payee database includes information identifying each managed payee known to a service provider, along with the information collected about each managed payee.

An electronic payee is a managed payee about whom a service provider maintains information enabling remittance to be issued electronically. An unmanaged payee is a payee about whom a service provider does not maintain information which aids in the handling of remittance. A merchant is a payee that issues bills for services rendered or goods purchased. Thus, a merchant is a special class of payee, a payee that issues bills. A merchant can be an unmanaged merchant, a managed merchant, or an electronic merchant (these terms are parallel in concept to unmanaged payee, managed payee, and electronic payee, respectively, as defined above)

For many service providers, payment processing dictates the form of remittance issued, i.e. electronic or paper. Some service providers use payment processing to determine a form of remittance based solely upon a status of a payee as a managed payee, with remittance issued in accordance with a managed payee's wishes. Thus, during payment processing, such a service provider determines if a payee identified in a payment request is a managed payee (or managed merchant). If so, information stored in a managed payee database is retrieved and remittance is issued in accordance with the stored information. If the retrieved information indicates that remittance should be issued electronically, the remittance is issued accordingly. And, if the retrieved information indicates that remittance should be issued on paper (check or draft), the remittance is likewise issued accordingly.

If a payee is not determined to be a managed payee, remittance will typically be issued on paper. In these cases, some service providers automatically issue a check drawn on a demand deposit account associated with the payor, typically known as a draft, as the form of remittance. A draft is a special class of check, one prepared by an entity other than an account holder of the account upon which the draft is drawn. Still other payment service providers perform risk processing to determine whether paper remittance will be a corporate check, drawn on a demand deposit account associated with the service provider, or a draft.

In risk processing, a payment request is evaluated against a set of rules that determines whether the credit can be issued "at risk" to the electronic payment service provider. Risk processing can be performed, as desired by particular service providers, in association with payments to unmanaged payees and/or managed payees, including both electronic and non-electronic managed payees. Rules include payment amount, payment velocity, and aggregate payment amount limits. An "at risk" credit is a credit from an account belonging to a service provider. Risk processing in only performed in those instances where a service provider is not assured of receiving funds in at least an amount of a payment made on behalf of a payor. If a determination is made that a payment will not be issued "at risk", payment is made by a draft drawn on a payor's demand deposit account prepared by a service provider.

A service provider can be assured of receiving funds in a "good funds" model of payment processing. In a good funds model, an electronic payment service provider performs a debit authorization against a payor's demand deposit account before issuance of a credit. That is, an electronic payment service provider first assures that funds from a payor's account are available before a credit is issued on behalf of that payor. If funds are not available, the credit is not issued. Some authorizations are performed asynchronously (in batch mode), while others are performed in real-time (e.g., ATM/POS debiting).

A service provider can also be assured of receiving funds in a "guaranteed funds" model of payment processing. In a guaranteed funds model, an entity other than a service provider commits to reimburse the service provider for any credits issued for which an associated debiting of a payor's demand deposit account fails. The guaranteeing entity is typically the payee, although it may be another entity such as a consumer service provider, to be discussed further below, or a financial institution at which the payor's demand deposit account is maintained. Other forms of risk processing will be described further below.

For other service providers, a status of a payee as a managed payee is but one factor considered in payment processing to determine a form of remittance. That is, payment is not automatically made in accordance with a form of payment preferred by a managed payee. Some service providers perform risk processing to determine if an "at risk" credit will be issued.

Still other service providers perform account scheming to determine a form of payment. In account scheming, if an account number included in a payment request does not match a known account scheme utilized by the payee, payment is made by paper. Yet other service providers perform both risk processing and account scheming for electronic payees to determine a form of payment.

Typically, a service provider has five mechanisms to complete payment to a payee on behalf of a payor. As discussed above, selection of a mechanism to complete payment is often made during payment processing. The first is ACH-ACH payment, which is all electronic, in which a service provider transmits both the credit portion and the remittance advice portion of remittance onto the ACH network for delivery. The second is ACH-Direct Send payment, which is also all electronic, in which a service provider transmits the credit portion onto the ACH network, and transmits the remittance advice portion directly to a payee via a network different than the ACH. Alternatively, in some ACH-Direct Send payments, remittance advice is delivered to a payee in hard copy. The third is Third Party payment, which is also all electronic, in which a service provider transmits both the credit portion and the remittance advice portion on to a third party remittance network for delivery. The fourth is Corporate Check payment, which is paper, in which a service provider delivers a check to a payee, the check being drawn on a demand deposit account belonging to the service provider. Remittance advice is printed upon the corporate check, or included therewith. The fifth is Draft payment, which also is paper, in which a service provider delivers a draft to a payee, the draft being drawn on a demand deposit account belonging to a payee and having remittance advice printed thereon, or included therewith. Consolidated payments can be made utilizing any payment mechanism other than draft. In consolidated payment a service provider makes payment to a single payee on behalf of multiple payors utilizing a single credit. The remittance advice associated with a consolidated payment identifies each payor in association with each payment amount.

An electronic biller is a biller that presents at least a subset of its bills, for at least a subset of its customers, electronically, either directly or through a biller service provider (BSP). A BSP is an entity that electronically presents bills to customers of an electronic biller on behalf of the electronic biller. A BSP can also be an electronic payment service provider. Such service providers are known as electronic billing and payment (EBP) service providers. Electronic bill presentment can be via any one of several electronic user interfaces, including Web-based interfaces, ATM-based interfaces, PC application-based interfaces, PDA-based interfaces, automated telephone system-based interfaces, mobile phone-based interfaces, and television set-top box-based interfaces.

Some service providers only make payments to a finite set of managed payees. These managed payees may or may not be electronic billers. Such payment service providers are said to offer a "closed" electronic payment service.

Still other service providers make payments to any payee, as long as the service provider knows the payee's name and address, typically obtained from a payor. Such service providers are said to offer an "open", or "pay anyone", electronic payment service. Of course, a payment to a payee that is not an electronic payee generally has to be a paper (check, draft, or other instrument) payment. Alternatively, the service provider may extend an invitation to the non-electronic payee to join its community of electronic managed payees, holding the payment until the payee joins, after which payment is released electronically. If the payee does not join, payment is either released as paper or returned.

The services offered by electronic payment service providers and EBP service providers have become widely accepted. Millions of bills are electronically presented to subscribers each month, and millions of payments are completed on behalf of subscribers each month. Many subscribers pay all of their bills and other obligations utilizing an electronic payment service provider or an EBP service provider. Thus, a service provider has become a central point of bill payment activity for these subscribers.

As will be appreciated by one of ordinary skill in the art, electronic funds transfer, whether viewed from a debit perspective or a credit perspective, is the most efficient form of funds transfer, both in terms of cost and speed. The costs associated with paper funds transfer, i.e., check or draft, include production, delivery, and handling costs. Electronic funds transfer does not have the same costs associated with paper funds transfer. Actual funds movement in paper funds transfer takes a longer time than in electronic funds transfer. Because of the efficiencies of electronic funds transfer, service providers and payees each typically prefer electronic funds transfer to paper funds transfer.

Payment by draft, to overcome risk, obviously is not as efficient as electronic funds transfer. Good funds risk processing requires that a service provider have a relationship with a financial institution which maintains a payor's demand deposit account. Thus, the good funds model of risk processing, through which funds preferably move electronically, is only useful in a limited number of instances, those in which a service provider has a relationship with a payor's financial institution. Guaranteed funds risk processing requires that a service provider have a relationship with an entity that agrees to take on any risk incurred by the service provider, typically a payee. Thus, the guaranteed funds model of risk processing, also through which funds preferably move electronically, is also only useful in a limited number of instances, those in which a service provider is indemnified by a party other than the payor.

In an attempt to overcome the deficiencies of drafts, good funds risk processing, and guaranteed funds risk processing, a new model of risk processing has recently been proposed. This new model is known as the debit-hold-credit model of risk processing. In this model, an electronic funds transfer debit against a payor's demand deposit account is transmitted via the ACH network to a payor's financial institution, then, after a predetermined amount of time has passed, and no negative results associated with the debit are received, an electronic funds transfer credit in favor of a payee's demand deposit account is transmitted onto the ACH network.

Limitations of the ACH network constrain how rapidly debits and credits can be accomplished. Currently, all interactions with the Federal Reserve System are accomplished through batch file transfers, after which individual requests are propagated from the Federal Reserve System to financial institutions through further batch file transfers. Thus, funds are not posted to accounts until at least the day after requests are initiated.

The ACH network is a "negative confirmation" network. That is, an originating entity never receives positive confirmation that a debit or credit request has been successfully completed. Rather, the originating entity only receives an "exception" when a debit or credit fails. A very high percentage (90+%) of exceptions are received within seventy-two hours. Thus a three-day hold period is typically utilized in the debit-hold-credit method. However, a risk still remains that some exceptions could be received after the three-day hold period.

FIG. 1 is a transition diagram that shows the sequence of payment request, response, funds posting, and associated information flows in the context of a service provider that is completing both debits and credits electronically through the ACH network utilizing the debit-hold-credit model. In the example of FIG. 1 a three-day hold period is assumed. Also in FIG. 1, the credit to the payee is transmitted via the ACH network, and the remittance advice is transmitted directly to the payee. However, the credit, as well as the remittance advice, could be transmitted via a third party network. Also, the remittance advice could be transmitted via the ACH network.

In FIG. 1 axis 101 represents a payor, axis 103 represents a financial institution which maintains a DDA (axis 102) associated with the payor 101. Also, a service provider is represented by axis 104, a service provider DDA is represented by axis 106. The service provider DDA 106 is maintained at a financial institution 105. Axis 110 represents a payee, and axis 109 represents the payee's DDA maintained at a financial institution represented by axis 108.

On day 1 the service provider 104 receives a payment request from or on behalf of payor 101, communication 107. On this day the service provider 104 begins payment processing. It will be recognized that for future-dated payment requests payment processing does not start on the day the payment request is received. The service provider 104 transmits an electronic funds transfer file containing a debit instruction to debit the payor's account 102 in favor of the service provider account 106 via the ACH network, communication 111. This transmission could be directly to a Federal Reserve Bank, represented by axis 199, or through the service provider financial institution 105. The Federal Reserve Bank 199 then forwards the debit instruction to the payor's financial institution 103, communication 112.

In this example, on day 2 funds move from the payor's account 102 at the payor's financial institution 103 to the service provider's account 106 at the service provider's financial institution 105, shown at detail 113. If funds are not available in the payor's account 102 an exception would instead be delivered to the service provider 104, typically by day 4, which is within →72 hours of transmission of the electronic funds transfer file.

After the three-day hold period has elapsed, on day 4, the service provider 104 transmits an electronic funds transfer file containing a credit instruction to credit the payee's account 109 from the service provider account 106 via the ACH network, communication 114. This transmission could be directly to the Federal Reserve Bank 199, or via the service provider financial institution 105. The Federal Reserve Bank 199 then forwards the credit instruction to the payee's financial institution 108, communication 115. On day 5 funds move from the service provider's account 106 at the service provider's financial institution 105 to the payee's account 109 at the payee's financial institution 108, detail 116. Also on day 5, the service provider 104 directly delivers remittance advice to the payee 110, communication 117. Alternatively, remittance advice could be delivered on day 4, in anticipation of the funds movement on day 5.

This model shows a total elapsed time from initiation of payment processing to deposit of funds in the payee's account of five (business) days. This five days is close to the time it takes to pay a payee utilizing a draft. Thus, while this risk processing model utilizes electronic funds transfer, it does not markedly, if at all, improve the speed over which funds move in paper funds transfer.

Accordingly, a need exists for a technique of providing an electronic payment service which accelerates the time to payment over existing techniques, yet subjects no more risk to a service provider than the existing techniques.

Some service providers have multiple methods to mitigate risk available. However, these service providers do not choose between the methods.

Implementation of a risk processing method, and thus form of payment, is dependent upon only one of several factors. In one factor, a consumer service provider with which a payor is associated determines the method of risk processing. Another factor is a payment product utilized by a payor. Examples of payment products include person-to-person payment services and business-to-business payment services. Individual payment products are each associated with a single risk processing method. Still another factor is a location of a payor's DDA. That is, a service provider has a good funds relationship with a particular payor's financial institution that enables the service provider to utilize good funds processing on all payments made on behalf of that payor. Yet another factor is the identity of a payee. That is, a service provider has a guaranteed funds relationship with a particular payee that enables the service provider to utilize guaranteed funds processing on all payments to that payee. As will be recognized by one of ordinary skill in the art, there are different costs, times to payment (speed), and risk levels associated with various risk processing models. Current electronic payment service do not differential between cost, speed, and/or risk in payment processing.

Accordingly, a need exists for a technique of providing an electronic payment service in which a method of payment processing is selected based upon one or more of the variables of cost, time to payment, and risk level.

OBJECTS OF THE INVENTION

It is an object of the present invention to provide an electronic payment technique which accelerates the time to payment over existing electronic payment techniques while subjecting a service provider to no more risk than the existing techniques.

Yet another object of the present invention is to provide an electronic payment service in which one or more of the variables of cost, time to payment, and risk level are utilized in selecting a risk processing method.

The above-stated objects, as well as other objects, features, and advantages, of the present invention will become readily apparent from the following detailed description which is to be read in conjunction with the appended drawings.

SUMMARY OF THE INVENTION

In accordance with the present invention, a method and system for making payment to a payee on behalf of a payor are provided. Payment could be a check, draft, or other paper instrument delivered to the payee, could be an electronic transfer of funds to the payee, or could be any other form of funds delivery, electronic or paper. A payor can be any individual, business, or organization which makes payments. A payee can be any individual, business, or organization which receives payments.

The system of the present invention includes one or more communications interfaces and one or more processors. Each communications interface is configured to receive and transmit information. The information is preferably received and transmitted via at least one network. Information received by a communications interface is passed on to one processor, and a processor causes a communications interface to transmit information. The at least one network, if utilized, could be, but is not limited to, the Internet, a local area network, a wide area network, and the public switched telephone network, as well as any other network capable of transmitting information, including a wireless network. A processor can comprise any type of processor capable of functioning to implement the method as described herein, including, but not limited to, a processor as found in a typical personal computer, mainframe computer, server-type computer, or any other type of computing device.

In accordance with the present invention, a payment request to pay the payee on behalf of the payor is received. The payment request could be received directly from the payor, or could be received from another entity, such as a consumer service provider. A consumer service provider is an entity that makes the services of the payment service provider available to the payor, but does not necessarily participate in the operations of providing the services.

One of a group of processing parameters is selected in accordance with which the payment request will be fulfilled. That is, the received payment request will be processed, resulting in the issuing of a payment, in accordance with a selected processing parameter. The selection of a parameter is made based upon the received payment request. That is, information contained in, or obtained based upon, the received payment request is utilized to select the processing parameter. This information could include, but is not limited to, any, or any combination, of the identity of the payee, the identity of the payor, the identity of a consumer service provider with which the payor is associated, the identity of a financial institution at which the payor maintains a deposit account, the identity of a financial institution at which the payee maintains a deposit account, an amount requested to be paid to the payee on behalf of the payor, and/or information associated with one or more prior payments made to the payee on behalf of the payor.

The group of processing parameters consists of at least two of three processing parameters. The group could consist of any two, or all three, of the processing parameters. The first processing parameter that could be a member of the group is a speed of processing parameter associated with completing the payment. If this parameter is selected, payment to the payee on behalf of the payor is completed, i.e., funds delivered to the payee, in a manner that is quicker than another manner, and perhaps the quickest manner possible.

The second processing parameter that could be a member of the group is a cost of processing parameter associated with completing the payment. If this parameter is selected, payment to the payee on behalf of the payor is completed in a manner that is less costly than another manner, and perhaps the least costly manner possible. The manner in which payment is completed could be a manner that is less costly to an entity completing the payment on behalf of the payor, could be a manner that is less costly to the payor, could be a manner that is less costly to the payee, could be a manner that is least costly to a consumer service provider, or could be a manner that is less costly to any combination of the entity making the payment, the payor, the payee, and/or the consumer service provider.

The third processing parameter that could be a member of the group is a risk of processing parameter associated with completing the payment. If this parameter is selected, payment to the payee on behalf of the payor is completed in manner that poses less financial risk to an entity completing the payment on behalf of the payor than another manner, and perhaps the least financially risky manner possible. A financial risk to the entity completing the payment on behalf of a payor arises when the payment to the payee is drawn on an account associated with the entity, not the payor. The entity completing the payment may not be able to collect funds from the payor to reimburse the entity for funds delivered to the payee on behalf of the payor. Also, the entity completing the payment might not be able to collect fees from the payor for providing the payment service to the payor.

After one of the processing parameters of the group of processing parameters is chosen, payment to the payee is effected on behalf of the payor in accordance with the selected processing parameter. Effecting payment includes processing the received payment request and issuing a payment. An issued payment could be a paper payment, such as a check drawn on an account associated with the entity completing the payment, or a draft drawn on an account associated with the payor. An issued payment could also be an electronic payment, such as an electronic funds transfer via the ACH, or another, network linking financial institutions, or even a credit card based payment. Dependent upon the selected parameter, payment is either made in a manner quicker than another manner, in a manner less costly than another manner, or in a manner less financially risky than another manner.

In one aspect of the present invention, the processing parameter is selected based upon any one of, or any combination of, five criteria. The first criterion is the identity of the payor. The second criterion is the identity of the payee. The third criterion is the amount of the payment. The fourth criterion is the identity of a consumer service provider with which the payor is associated. It should be noted that it is not required the payor be associated with a consumer service provider. The fifth criterion is information associate with one or more prior payments to the payee paid on behalf of the payor. That is, the processing parameter is made based upon the payor's history with the entity completing the payment.

In another aspect of the present invention, each processing parameter is associated with a priority level. Thus, each processing parameter of the group has a priority relative to the other parameter, or parameters, of the group. The priority levels could be set by the entity making the payment on behalf of the payor, could be set by the payor, could be set by the payee, could be set by a consumer service provider with which the payor may be associated, or could be set by any other entity. The processing parameter having the highest priority level is identified. The identified processing parameter having the highest priority is the parameter that is the selected parameter.

In a further aspect of the present invention, a payment service provider receives the payment request. A payment service provider can be any entity that completes payment on behalf of a payor. In this aspect, a priority of a parameter is determined by at least one of the payor, a consumer service provider, and the payment service provider. It should be noted that the payee could also be a consumer service provider.

In a still further aspect of the present invention, the group of parameters consists of all three processing parameters. If the payor determines a priority of a processing parameter, the payor determines a priority of the speed of processing parameter and the cost of processing parameter, but not the risk of processing parameter. Thus, the payor sets the parameters of speed of processing and cost of processing relative to one another, but does not prioritize the risk of processing parameter. This is especially beneficial because the risk of processing parameter is associated with a risk that funds might not be able to be collected from that payor. Also in this aspect, if either of, or both of, the payment service provider and a consumer service provider determines a priority of a processing parameter, that entity determines priority between all three parameters.

In another further aspect of the present invention, each parameter is again associated with a priority and the payment request is again received by a payment service provider. In this aspect, a determination is made as to if any consumer service provider associated with the payor has determined a priority of each parameter. This aspect does not require that the payor be associated with a consumer service provider. If it is determined that a consumer service provider associated with the payor has determined a priority of each processing parameter, the processing parameter in accordance with which the payment is effected is the parameter having the highest priority as determined by the consumer service provider. That is, even if the payment service provider and/or the payor have determined priorities, those priorities are not utilized to select the parameter.

Also in this aspect, if a consumer service provider has not determined a priority of each parameter, perhaps because the payor is not associated with a consumer service provider, the parameter in accordance with which the payment is effected is the parameter having the highest priority as determined by the payment service provider.

In a still further aspect, the group of processing parameters consists of all three processing parameters. A determination is made as to if the payor has determined a priority of the speed of processing parameter and the cost of processing parameter. If it is determined that a consumer service provider has determined priorities, and if it is determined that the payor has determined the prioritization between the cost of processing and the speed of processing parameters, the parameter in accordance with which the payment is effected is a parameter having a highest priority as determined by at least one of the consumer service provider and/or the payor. However, if it is determined that a consumer service provider has not determined priorities, but if it is determined that the payor has determined the prioritization between the cost of processing and the speed of processing parameters, the parameter in accordance with which the payment is effected is a parameter having a highest priority as determined by at least one of the payment service provider and the payor.

In another aspect of the present invention, each processing parameter of the group is again associated with a priority. A determination is made as to which one of the parameters of the group of processing parameters has the highest priority. A determination is made as to which of those of multiple debit/ credit combinations is available to effect payment in accordance with the processing parameter having the highest priority. If only one debit/credit combination is identified as being available, the payment is effected in accordance with the processing parameter having the highest priority and by the one identified debit/credit combination.

Certain debit/credit combinations may not have attributes that are well suited for use in effecting payment in accordance with certain parameters. For example, different debit/credit combinations are associated with different speeds to completion of a payment, cost of completion of a payment, and/or risks associated with a payment. Thus, if the identified parameter having the highest priority is speed of processing, only those debit/credit combinations associated with a shorter time to payment completion are identified. If the identified parameter having the highest priority is cost of processing, only those debit/credit combinations associated with a low cost are identified. If the identified parameter having the highest priority is risk of processing, only those debit/credit combinations associated with a reduced risk are identified.

A debit portion of a debit/credit combination is the obtaining of funds from the payor, and the credit portion of the debit/credit combination is the delivery of funds to the payee. Multiple debit/credit combinations are available to the entity completing payment on behalf of the payor. Debit portions include, but are not limited to, a draft drawn on a deposit account of the payor, a charge to a payor's credit card, an electronic debiting of the payor's deposit account only after determining that funds are available in the payor's deposit account, an electronic debiting of the payor's deposit account only after determining that an entity exists from which to collect funds if the debiting of the payor's deposit account fails, an electronic debiting of the payor's deposit account after determining that a risk of effecting payment on behalf of the payor is acceptable, and an automatic debiting of the payor's deposit account irrespective of funds availability or risk.

Credit portions of debit/credit combination include, but are not limited to, a check drawn on a deposit account associated with the entity effecting the payment, an electronic or paper transfer of funds to the payee from the paying entity's deposit account only after receiving funds from the payor, an electronic or paper transfer of funds from the paying entity's deposit account to the payee a predetermined period of time after initiating an electronic debiting of the payor's deposit account, an electronic or paper transfer of funds from the paying entity's deposit account to the payee only after determining that funds are available from the payor's deposit account, an electronic or paper transfer of funds from the paying entity's deposit account to the payee only after determining that an entity exists from which to collect funds if funds cannot be collected from the payor, and an electronic or paper transfer of funds from the payor's deposit account to the payee. It will be appreciated that for some debit/credit combinations, the debit portion and the credit portion are closely coupled, such as, for example, payment by check or draft.

In a further aspect of the present invention, each of the plurality of debit/credit combinations is associated with a rank for each processing parameter of the group. Each debit/credit combination is ranked from highest to lowest for each parameter. If the speed of processing parameters is included in the group, each debit/credit combination is ranked, from highest to lowest, as to the speed with which a payment can be completed utilizing that combination. If the cost of processing parameter is included in the group, each debit/credit combination is ranked, from highest to lowest, as to the cost with which a payment can be completed utilizing that combination. If the risk of processing parameter is included in the group, each combination is ranked, from highest to lowest, as to the risk associated with completing a payment utilizing that combination. It should be noted that, preferably, the debit/credit combination having the lowest associated cost is ranked highest, while that having the highest associated cost is ranked lowest.

In this aspect, if more than one of the multiple debit/credit combinations is determined to be available for use in effecting payment in accordance with the highest priority processing parameter of the group, the one of the more than one available debit/credit combination having a highest rank for the parameter having the highest priority is identified and the payment is effected in accordance with the highest priority processing parameter and by the identified debit/credit combination having the highest rank.

In a still further aspect of the present invention, if none of more than one debit/combinations available to effect the payment in accordance with the processing parameter having the highest priority has a highest rank, the payment is effected in accordance with a parameter other than the highest priority parameter.

In yet another aspect of the present invention, a form of payment is selected based upon the selected processing parameter and the payment is effected in the selected form. That is, in this aspect at least, the selected parameter dictates the form of payment.

In a further aspect, the form of payment could be a draft drawn on a deposit account belonging to the payor, could be a check drawn on a deposit account other than the payor's deposit account, and could be an electronic funds transfer drawn on an account other than the payor's deposit account.

It will also be understood by those skilled in the art that the invention is easily implemented using computer software. More particularly, software can be easily programmed, using routine programming skill, based upon the description of the invention set forth herein and stored on a storage medium which is readable by a computer processor to cause the processor to operate such that the computer performs in the manner described above.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 6A is an exemplary depiction of debiting option metadata in accordance with the present invention.

FIG. 6B is an exemplary depiction of other debiting option metadata in accordance with the present invention.

FIG. 7 is an exemplary depiction of crediting option metadata in accordance with the present invention.

DETAILED DESCRIPTION OF A PREFERRED EMBODIMENT

Figure 2:
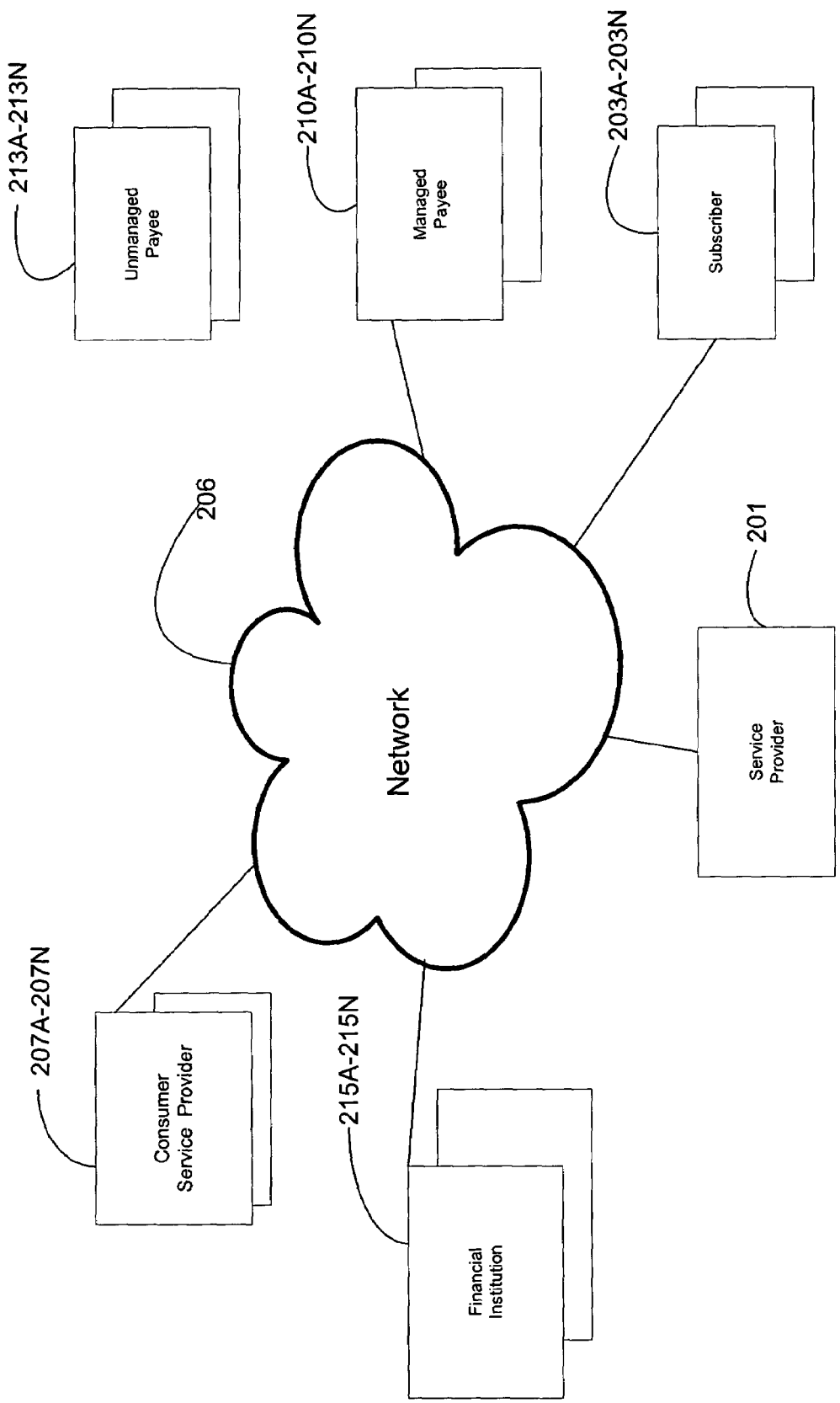
FIG. 2 is simplified depiction of relationships between entities participating in a payment service in accordance with the present invention.

FIG. 2 depicts a service provider 201 of at least an electronic payment service and a set of entities with which the service provider 201 interacts in providing the service. The service provider 201 could, as desired, also provide an electronic bill presentment service, as well as other electronic commerce services. Thus, the service provider 201 is at least an electronic payment service provider, and could, as desired, be an electronic billing and payment service provider.

The service provider 201 provides the payment service to one or more subscribers 203A-203N. Subscribers 203A-203N communicate with the service provider 201 via a network 206. The network 206 preferably is the Internet, though it could be another public network, or even a private network. Further, the network 206 could be multiple networks.

A subscriber 203A-203N, in some instances, communicates directly with the service provider 201. In other instances, a subscriber 203A-203N communicates with the service provider 201 through one of consumer service providers 207A-207N.

A consumer service provider (CSP) 207A-207N is an entity that offers a payment service to certain ones of subscribers 203A-203N, while the service provider 201 provides the functionality, i.e., payment processing, of completing payments. Examples of CSPs include, but are not limited to, financial institutions, Internet portals, payees, billers, and software providers. A CSP 207A-207N may, as desired, present a payment service user interface to a subscriber 203A-203N to provide information to, and receive information from, a subscriber 203A-203N. In such instances, such a CSP 207A-207N receives information from the service provider 201, via the network 206, and then presents such to a subscriber 203A-203N. Likewise in such instances, a CSP 207A-207N receives information from a subscriber 203A-203N, and then passes such to the service provider 201 via the network 206. Communications between a subscriber 203A-203N and a CSP 203A-203N can, as desired, be via the network 206, via another network, or otherwise.

In other situations in which a CSP 207A-207N offers the payment service, the service provider 201 provides a payment service user interface directly to a subscriber 203A-203N, via the network 206, that is branded as belonging to a CSP 207A-207N. A CSP is also known as a sponsor.

Also shown in FIG. 2 is one or more unmanaged payees 213A-213N. An unmanaged payee 213A-213N and the service provider 201 do not have a relationship. Because of the lack of a relationship, FIG. 2 does not depict unmanaged payees 213A-213N in communication with the network 206. It should be noted that the service provider 201 interacts with an unmanaged payee, 213A-213N in traditional paper form when making payment to an unmanaged payee 213A-213N.

FIG. 2 also depicts one or more managed payees 210A-210N. As discussed above, a managed payee 210A-210N is a payee about whom the service provider 201 maintains information that enables remittance to that managed payee to be handled in some improved and/or optimal fashion, such as electronically via the network 206, and/or via another network. It is not required that each managed payee communicate via the network 206, or via any other network.

Also shown in FIG. 2 is one or more financial institutions 215A-215N. Multiple ones of the financial institutions 215A-215N maintain a demand deposit account belonging to the service provider 201. Preferably, a financial institution (FI) 215A-215N maintaining a service provider account communicates with the service provider 201 via the network 206. However, not all aspects of the present invention require such electronic communication. Also, each of the subscribers 203A-203N is associated with at least one respective demand deposit account maintained at one of the FIs 215A-215N. Furthermore, each of the managed payees 210A-210N is associated with at least one respective demand deposit account maintained at one of the FIs 215A-215N. The present invention does not require that each FI 215A-215N communicate via the network 206.

Figure 3:
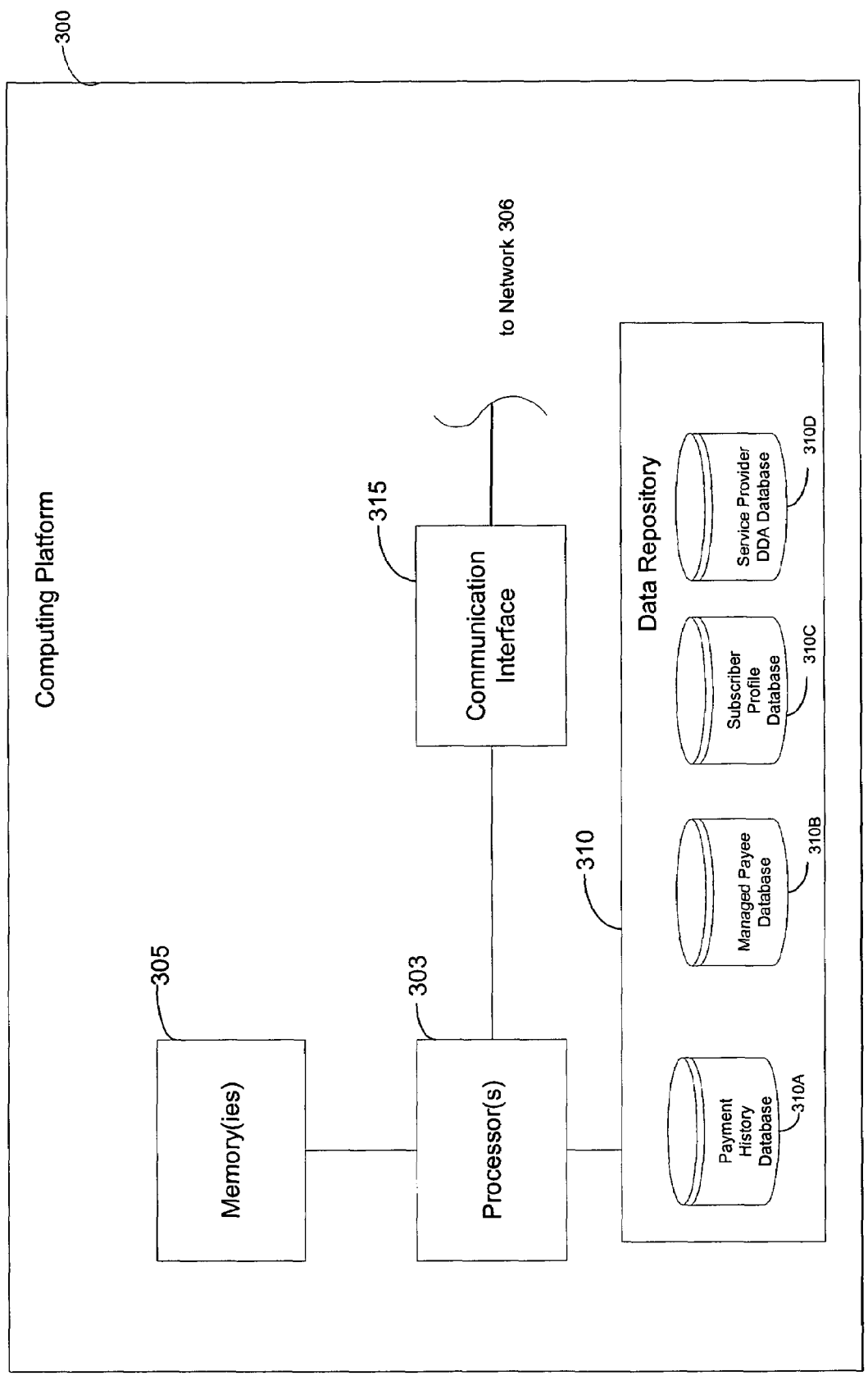
FIG. 3 is a simplified depiction of a service provider computing system for providing the payment service in accordance with the present invention.

The service provider 201 maintains a computing system to support the electronic payment service of the present invention. The computing system includes one or more computing platforms, with one computing platform 300 shown in FIG. 3, networked together. Each computing platform consists of one or more processors 303 configured to execute programming instructions stored in at least one memory 305. Each computing platform 300 includes one or more communication interfaces 315 for transmitting and receiving data at least via the network 206. As desired, a communication interface 315 also transmits and/or receives data via one or more networks other than the network 306. Additionally, the computing system includes a data repository 310, which may reside on the computing platforms 300, as shown in FIG. 3, other dedicated database servers, or elsewhere on a computing network connecting computing platforms 300.

The data repository 310 preferably includes a payment history database 310A that stores information associated with each payment completed by the service provider 201 on behalf of each subscriber 203A-203N. The data repository 310 also includes a managed payee database 310B that stores information associated with managed payees 210A-210N. The managed payee database 310B will be further discussed below. The data repository 310 also includes a subscriber profile database 310C that stores information associated with subscribers 203A-203N. The subscriber profile database 310C will be further discussed below. Also included in the data repository 310 is a service provider DDA database 310D, storing information associated with each service provider demand deposit account. The service provider DDA database 310D could also, as desired, store information associated with DDAs of the subscribers 203A-203N and of the managed payees 210A-210N, in addition to information associated with service provider accounts that are not demand deposit accounts, such as credit accounts. Other information may also, as desired, be stored in the data repository 310, though not shown in FIG. 3.

Multiple (Distributed) Operating Accounts

An internal funds transfer, also known as an "on us" funds transfer, is a transfer of funds between accounts maintained at a single FI 215A-215N. On us funds transfers are completed more rapidly than funds transfers between accounts maintained at separate FIs 215A-215N. Typically, "on us" funds transfers are posted by a FI 215A-215N the same day an "on us" funds transfer request is received. According to this aspect of the present invention, to increase the speed at which payment requests are fulfilled, the service provider 201 maintains multiple demand deposit accounts, each at a different one of the financial institutions 215A-215N.

Information associated with each of the multiple service provider DDAs is stored in the service provider DDA database 310D. The stored information includes an account number of each of the multiple service provider DDAs and a routing number of each of the financial institutions 215A-215N at which a service provider DDA is maintained. Beneficially, though not required, the stored information also includes a current balance of each of the multiple service provider DDAs.

Selection of a financial institution 215A-215N at which to maintain a service provider DDA is made based at least in part upon information stored in at least one of the payment history database 310A, the managed payee database 210B, and/or the subscriber profile database 310C.

Establishment of a service provider DDA at a particular FI 215A-215N can, as desired, be triggered based upon a number of subscribers 203A-203N associated with DDAs maintained at a certain FI 215A-215N. Information identifying a routing number of each subscriber's financial institution is stored in the subscriber profile database 310C.

In this alternative, a processor 303 at least once, or possibly periodically, sweeps (reads each entry) the subscriber profile database 310C and identifies the number of occurrences of each routing number appearing in the subscriber profile database 310C. For those routing numbers occurring a predetermined number of times, set as desired by the service provider 201, the processor 303 stores information identifying that financial institution 215A-215N in a candidate financial institution list, which preferably is a part of the data repository 310. Alternatively, the processor 303 could maintain the candidate financial institution list as a list of all financial institutions referenced in the subscriber profile database 310C, each associated with its number of occurrences. The candidate financial institution list could be beneficially sorted by number of occurrences. As desired, the processor 303 could also determine, prior to storing information in the candidate financial institution list, if a service provider DDA is already maintained at a given financial institution. If so, information identifying that financial institution is not stored in the candidate financial institution list. Service provider 201 personnel utilize the candidate financial institutions list to establish (open) service provider DDAs.

Establishment of a service provider DDA at a particular FI 215A-215N can, as desired, be triggered based upon a number of electronic managed payees 210A-210N each being associated with a DDA maintained at a certain financial institution 215A-215N. Information identifying a routing number of each electronic managed payee's financial institution is stored in the managed payee database 210B.

In this alternative, the processor 303 at least once, or possibly periodically, sweeps the managed payee database 310B and identifies the number of occurrences of each routing number appearing in that database. For those routing numbers occurring a predetermined number of times, set as desired by the service provider 201, the processor 303 stores information identifying that financial institution 215A-215N in the candidate financial institution list. Alternatively, the processor 303 could maintain the candidate financial institution list as a list of all financial institutions referenced in the managed payee database 310B, each associated with its number of occurrences. The candidate financial institution list could be beneficially sorted by number of occurrences. As desired, the processor 303 could also determine, prior to storing information in the candidate financial institution list, if a service provider DDA is already maintained at a given financial institution. If so, information identifying that financial institution is not stored in the candidate financial institution list. As discussed above, service provider 201 personnel utilize the candidate financial institutions list to establish service provider DDAs.

Selection of a financial institution 215A-215N at which to establish a service provider DDA can be triggered based upon a volume payments made on behalf of subscribers 203A-203N, as well as a volume of payments made to electronic managed payees 210A-210N. Information associated with each payment completed by the service provider 201 is stored in the payment history database 310A. This includes information identifying the payor (subscriber 203A-203N) and payee (managed payee 210A-210N or unmanaged payee 213A-213N).

In this alternative, the processor 303 at least once, or possibly periodically, sweeps the payment history database 310A and identifies the number of occurrences of payment made on behalf of each subscriber 203A-203N and the number of occurrences of payment made to each electronic managed payee 210A-210N. For those subscribers 203A-203N associated with a predetermined number of occurrences of payment, set as desired by the service provider 201, the processor 303 then accesses the subscriber profile database 310C and retrieves the routing numbers associated with these subscribers 203A-203N. Alternatively, the processor 303 could maintain the candidate financial institution list as a list of all financial institutions referenced in the subscriber profile database 310C, each associated with its number of payments. The candidate financial institution list could be beneficially sorted by number of payments. And, for those electronic managed payees 210A-210N associated with a predetermined number of occurrences of payment, set as desired by the service provider 201, the processor 303 access the managed payee database 310B and retrieves the routing number associated with these managed payees 210A-210N. Alternatively, the processor 303 could maintain the candidate financial institution list as a list of all financial institutions referenced in the managed payee database 310B, each associated with its number of payments. The candidate financial institution list could be beneficially sorted by number of payments.

The processor 303 stores information identifying those financial institutions 215A-215N associated with the retrieved routing numbers in the candidate financial institution list. As discussed above, the processor 303 could also, as desired, determine, prior to storing information in the candidate financial institution list, if a service provider DDA is already maintained at a given financial institution. If so, information identifying that financial institution is not stored in the candidate financial institution list. As discussed above, service provider 201 personnel utilize the candidate financial institutions list to establish service provider DDAs. Other methods, beyond the ones described above, can, as desired, be utilized to select financial institutions 213A-213N at which to maintain service provider DDAs.

Because the service provider 201 is associated with multiple DDAs, any received payment request to pay an electronic managed payee 210A-210N can give rise to one of six "account postures". In the first account posture, the payor (subscriber) DDA and the payee (electronic managed payee) DDA are maintained at the same FI 215A-215N, while the service provider 201 is not associated with a DDA at that financial institution 215A-215N.

In the second account posture, the payor, the payee, and the service provider 201 are each associated with DDAs maintained at the same financial institution 215A-215N.

In the third account posture, the payor DDA and the payee DDA are maintained at different financial institutions, while the service provider 201 is associated with DDAs maintained at both these financial institutions 215A-215N.

In the fourth account posture, the payor DDA and the payee DDA are maintained at different financial institutions 215A-215N, while the service provider 201 is associated with a DDA maintained at the payor's financial institution, but is not associated with a DDA maintained at the payee's financial institution.

In the fifth account posture, the payor DDA and the payee DDA are maintained at different financial institutions, while the service provider 201 is associated with a DDA maintained at the payee's financial institution, but is not associated with a DDA maintained at the payor's financial institution.

In the sixth account posture, the payor DDA and the payee DDA are maintained at different financial institutions, while the service provider 201 is not associated with a DDA maintained at either the payor's financial institution, or the payee's financial institution.

Figure 4:
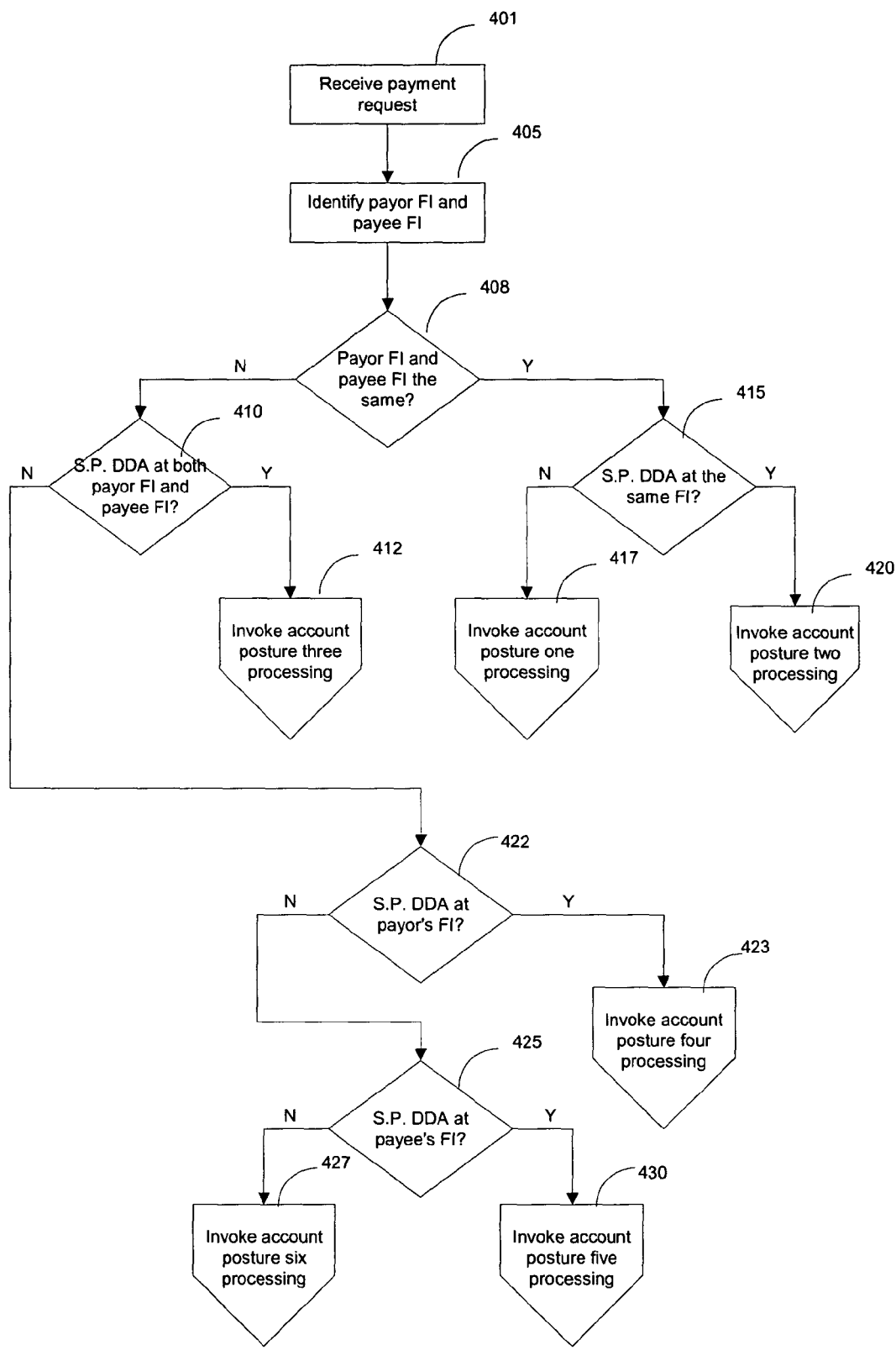
FIG. 4 is simplified depiction of exemplary operations performed to identify an account posture associated with a payment request in accordance with the present invention.

FIG. 4 is a simplified depiction of exemplary operations during payment processing performed in accordance with one aspect of the present invention to identify an account posture associated with a payment request. It should be noted that the operations depicted in FIG. 4 could be performed in a different order. Additionally, other operations could be, as desired, performed to identify an account posture associated with a payment request. At step 401 a payment request, including at least information identifying a subscriber 203A-203N (the payor), a payee (an electronic managed payee in this example), and a payment amount, is received by a communication interface 315 via the network 206. The received payment request is passed on to a service provider processor 303.

The processor 303 identifies the financial institution 215A-215N at which the payor's DDA is maintained and the financial institution 215A-215N at which the payee's DDA is maintained. It should be noted that a payor could be associated with multiple DDAs, perhaps at multiple financial institutions 215A-215N. In such instances, information identifying each DDA is included in the subscriber profile database 310C. To identify the payor's FI, or FIs, the processor 303 accesses the subscriber profile database 310C based upon information contained in the received payment request or based upon a prior user preference setting, and retrieves the routing number of the payor's FI for the particular DDA to be used as the funding account. To identify the payee's FI, the processor 303 accesses the managed payee database 210B, based upon information contained in the received payment request, and retrieves the routing number of the payee's FI for the particular remittance center to be targeted.

At step 408 the processor 303 determines if the payor's FI is the same as the payee's FI. This is accomplished by comparing the retrieved routing numbers. If the routing numbers are the same, operations continue with step 415. If the routing numbers are different, operations continue with step 410.

At step 415 the processor 303 determines if the service provider 201 is associated with a DDA maintained at the payor's and payee's common financial institution. In FIG. 4 the service provider 201 is referred to as "S.P." To do so, the processor 303 accesses the service provider DDA database 310D and determines if the routing number of the common payor/payee financial institution is contained therein. If not, the processor 303 invokes account posture one processing, to be discussed further below, to complete the payment to the payee on behalf of the payor, step 417. If so, the processor 303 invokes account posture two processing, to be discussed further below, to complete the payment to the payee on behalf of the payor, step 420.

At step 410, performed if the payor's financial institution is different than the payee's financial institution, the processor 303 determines if the service provider 201 is associated with a DDA at both the payor's FI and the payee's FI. To make this determination, the processor 303 accesses the service provider DDA database 310D and determines if both the routing number of the payor's FI and the routing number of the payee's FI are contained therein. If the service provider 201 does not have a demand deposit account at both the payor's FI and the payee's FI, operations continue with step 422. If the service provider 201 is associated with a DDA at the payor's FI and a DDA at the payee's FI, operations continue with step 412. At step 412 the processor 303 invokes account posture three processing, to be discussed further below, to complete payment to the payee on behalf of the payor.

At step 422 the processor 303 determines if the service provider 201 is associated with a DDA at the payor's FI based upon, as above, information stored in the service provider DDA database 310D and the routing number of the payor's FI. If not, operations continue with step 425. If so, operations continue with step 423 in which the processor 303 invokes account posture four processing, to be discussed further below, to complete payment to the payee on behalf of the payor.

If the service provider 201 is not associated with a DDA maintained at the payor's FI, at step 425 the processor 303 determines if the service provider 201 is associated with a DDA at the payee's FI. This determination is made, as above, based upon information stored in the service provider DDA database 310D and the routing number of the payee's financial institution. If so, operations continue with step 430 in which the processor 303 invokes account posture five processing, to be discussed further below, to complete payment to the payee on behalf of the payor. If not, operations continue with step 427 in which the processor 303 invokes account posture six processing, to be discussed further below, to complete payment to the payee on behalf of the payor.

FIGS. 5A through 5E are transition diagrams showing operations in completing payment in accordance with account postures one through five. For any of the account postures, whether a depicted action occurs on one day or another may be variable. What is depicted in FIGS. 5A through 5E is the processing giving rise to the quickest funds delivery to a payee, while protecting the service provider 201 from risk.

Preferably the service provider 201 transmits debit instructions and/or credit instructions directly to those financial institutions 215A-215N that maintain service provider DDAs. However, in some instances debit and/or credit instructions may be transmitted to such financial institutions via the ACH network, or another network. The possibility of use of a paper instrument (check or draft) has been excluded from this discussion for the sake of simplicity.

For each debit instruction issued by the service provider 201 to a FI 215A-215N at which a service provider DDA is maintained, the service provider 201 issues a confirmation request to that financial institution to determine if the debiting was successful, or that the corresponding credit into the service provider DDA was successful The service provider 201 receives back a response indicating success or failure. If the response indicates failure, a corresponding credit to the debiting is not issued. If the response indicates success, the corresponding credit is issued. Preferably, this debit confirmation request-response is a fully automated real-time communication. However, it could be completely manual, or only partially automated. Further, if fully automated, the process could be unique to each financial institution, rather than standard for all financial institutions.

The service provider 201 maintains funds in each of the multiple DDAs. As introduced above, beneficially a current balance of each of the multiple DDAs is reflected in the service provider DDA database 310D. As any service provider DDA is credited or debited, a service provider processor 303 updates the balance reflected in the service provider DDA database 310D. Also, as necessary, the processor 303, via wire transfer requests or similar arrangement, redistributes funds between the service provider DDAs, as will be discussed further below. Any redistribution of funds is likewise reflected in the stored balances, if included.

Use of multiple service provider demand deposit accounts enables the service provider 201 to accelerate many payments to payees as compared to the debit-hold-credit model, while incurring no additional risk beyond that incurred in the debit-hold-credit model.

Figure 5A:
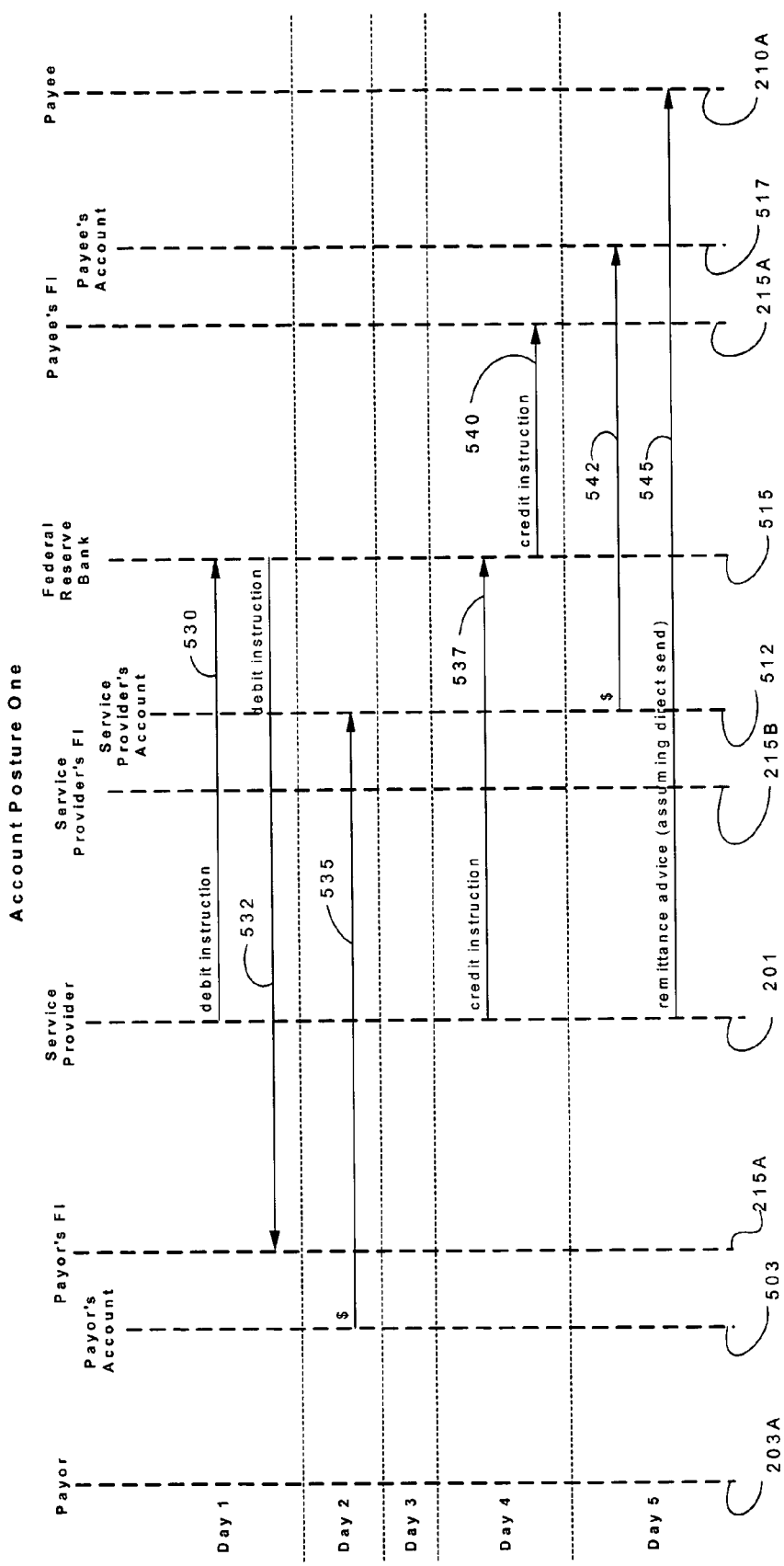
FIG. 5A is a first transition diagram showing an exemplary sequence of funds posting and associated information flows in accordance with the present invention.

FIG. 5A is a transition diagram that shows the sequence of funds posting and associated information flows after the processor 303 invokes account posture one processing at step 417 of FIG. 4. The time to payment in this account posture is effectively the same as in the debit-hold-credit model, five (business) days.

Axis 203A represents a payor, in this example subscriber 203A. Axis 503 represents the payor's DDA maintained at financial institution 215A, which is represented by axis 215A. Note that in this account posture, both the payor DDA 503 and the payee DDA 517 are maintained at the same financial institution. As such, the payee's financial institution 215A is represented by another instance of axis 215A. Axis 201 represents the service provider. Axis 215B represents a service provider financial institution. Axis 512 represents a service provider DDA at FI 215B. Axis 515 represents a Federal Reserve Bank. Axis 517 represents the payee's DDA at FI 215A. Axis 210A represents the payee.

On day 1 the processor 303 generates a debit instruction to debit the payor's DDA 503 in favor of the service provider DDA 512. The processor 303 causes a communication interface 315 to transmit the generated debit instruction. Communication 530 depicts the generated debit instruction being transmitted from the service provider 201 to the Federal Reserve Bank 515 via the ACH network. Communication 532 depicts the debit instruction being forwarded on to the payor's FI 215A by the Federal Reserve Bank 515 via the ACH network.

Detail 535 depicts funds moving from the payor's DDA 503 to the service provider's DDA 512 on day 2, due to the time lag incurred because of the batch transmission format of the ACH network. Because the service provider 201 does not have a relationship with the payor's FI 215A the service provider 201 cannot obtain a confirmation that the debiting was successful. Rather, the service provider 201 instead waits, as in the debit-hold-credit method, a period of time before issuing a credit to the payee 210A. As above, this hold period is three days, though it certainly could be a different period of time.

Assuming that the service provider 201 does not receive an exception, on day 4 the processor 303 generates a credit instruction to credit the payee's DDA 517 from the service provider's DDA 512. It should be noted that any service provider DDA could, as desired, be utilized as the source of the credit. The processor 405 causes a communication interface 315 to transmit the generated credit instruction. Communication 537 depicts the credit instruction being transmitted from the service provider 201 to the Federal Reserve Bank 515 via the ACH network. Communication 540 depicts the credit instruction being forwarded to the payee's financial institution 215A by the Federal Reserve Bank 515 via the ACH network.

On day 5 funds move from the service provider's DDA 512 to the payee's DDA 517, as shown in detail 542. Also on day 5 the processor 303 generates remittance advice and causes a communication interface 315 to transmit the remittance advice to the payee 210A, via the network 206, communication 545. Alternatively, the remittance advice could have been sent a day earlier, in association with transmission of the credit instruction, in anticipation of the propagation of funds to the payee.) The payment request is now fulfilled. Of course, remittance advice could be delivered in another manner, as desired, such as via another network, or via hardcopy.

Figure 5B:
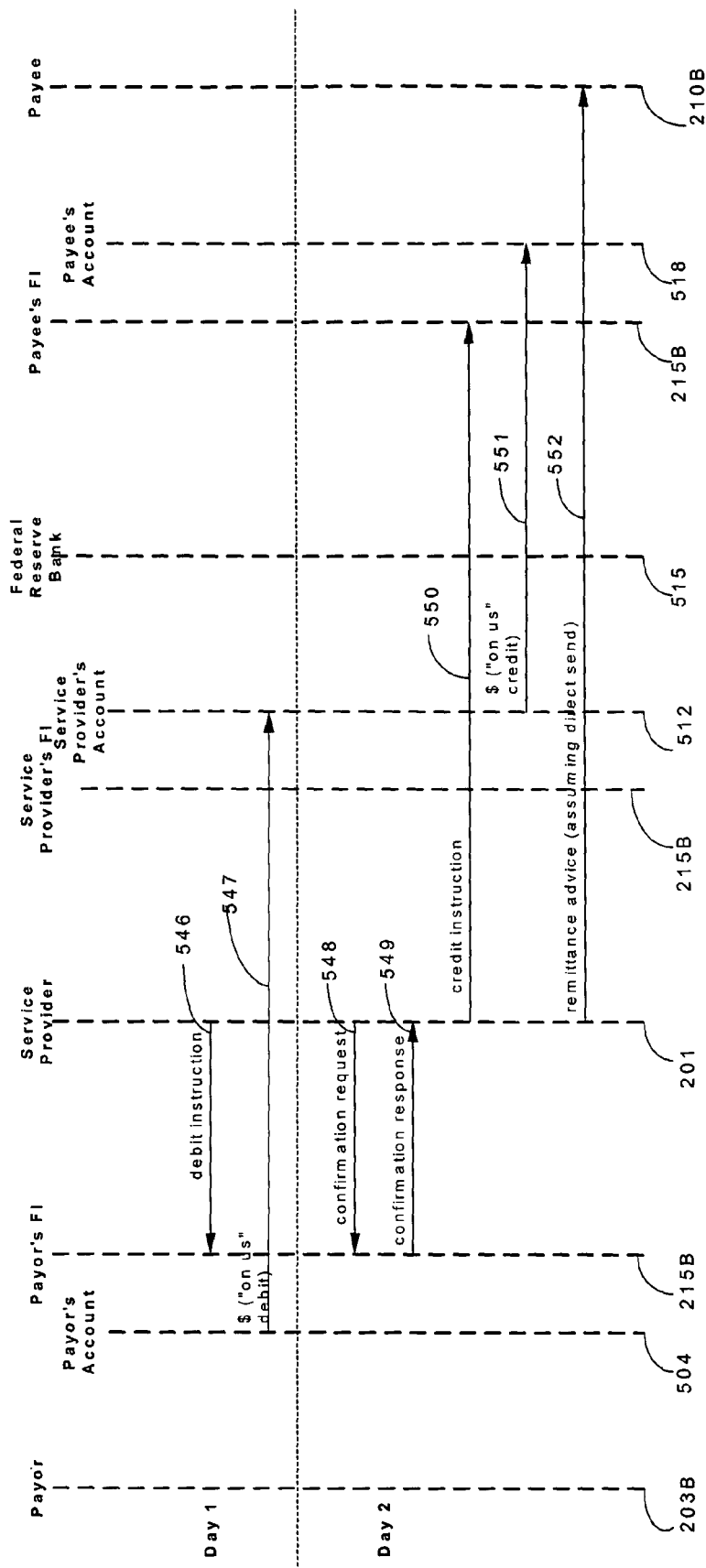
FIG. 5B is a second transition diagram showing an exemplary sequence of funds posting and associated information flows in accordance with the present invention

FIG. 5B is a transition diagram that shows the sequence of funds posting and information flows after the processor 303 invokes account posture two processing at step 420 of FIG. 4. The time to payment in this account posture is only two days, while the service provider 201 is at no more risk than in the debit-hold-credit model.

Axis 203B represents a payor, in this example subscriber 203B. Axis 504 represents the payor's DDA maintained at financial institution 215B, which is represented by axis 215B. Note that in this account posture, the payor DDA 504, payee DDA 518, and a service provider DDA 512 are maintained at the same financial institution, FI 215B. As such, the service provider's FI is represented by another instance of axis 215B, and the payee's financial institution is represented by still another instance of axis 215B. Axis 515 represents the Federal Reserve Bank. Axis 518 represents the payee's DDA. Axis 210B represents the payee.

On day 1 the processor 303 generates a debit instruction to debit the payor's DDA 504 in favor of the service provider DDA 512. The processor 303 causes a communication interface 315 to transmit the generated debit instruction. Communication 546 depicts the generated debit instruction being transmitted from the service provider 201 directly to the payores FI 215B, which also is the service provider's FI 215B. This transmission is preferably via network 206, but could be, as desired, via another network. Because this is an "on us" transaction, detail 547 depicts funds moving from the payor's DDA 504 to the service provider's DDA 512 on day 1.

On day 2 the processor 303 generates a confirmation request and causes a communication interface 315 to transmit the generated confirmation request to common financial institution 215B, via the network 206, communication 548. Communication 548 could be, as desired, via another network. Communication 549 depicts a positive confirmation response being transmitted from the common financial institution 215B to the service provider 201 via the network 206. Of course, communication 549 could, as desired, be via another network. It will be recognized that the confirmation request could be, as desired, generated and transmitted on day 1. Further, the confirmation request/response could, as desired, be manual.

After receipt of a positive confirmation response, shown in FIG. 5B as being on day 2, the processor 303 generates a credit instruction to credit the payee's DDA 518 from the service provider's DDA 512. The processor 303 causes a communication interface 315 to transmit the generated credit instruction to the common FI 215B preferably via network 206, communication 550.

Because this is another "on us" transaction, detail 551 depicts funds moving from the service provider's DDA 512 to the payee's DDA 518 on day 2. Also on day 2 the processor 303 generates and causes a communication interface 315 to transmit remittance advice to the payee 210A via the network 206, communication 552. The payment request is now fulfilled. As desired, remittance advice could be sent utilizing another method.

Figure 5C:
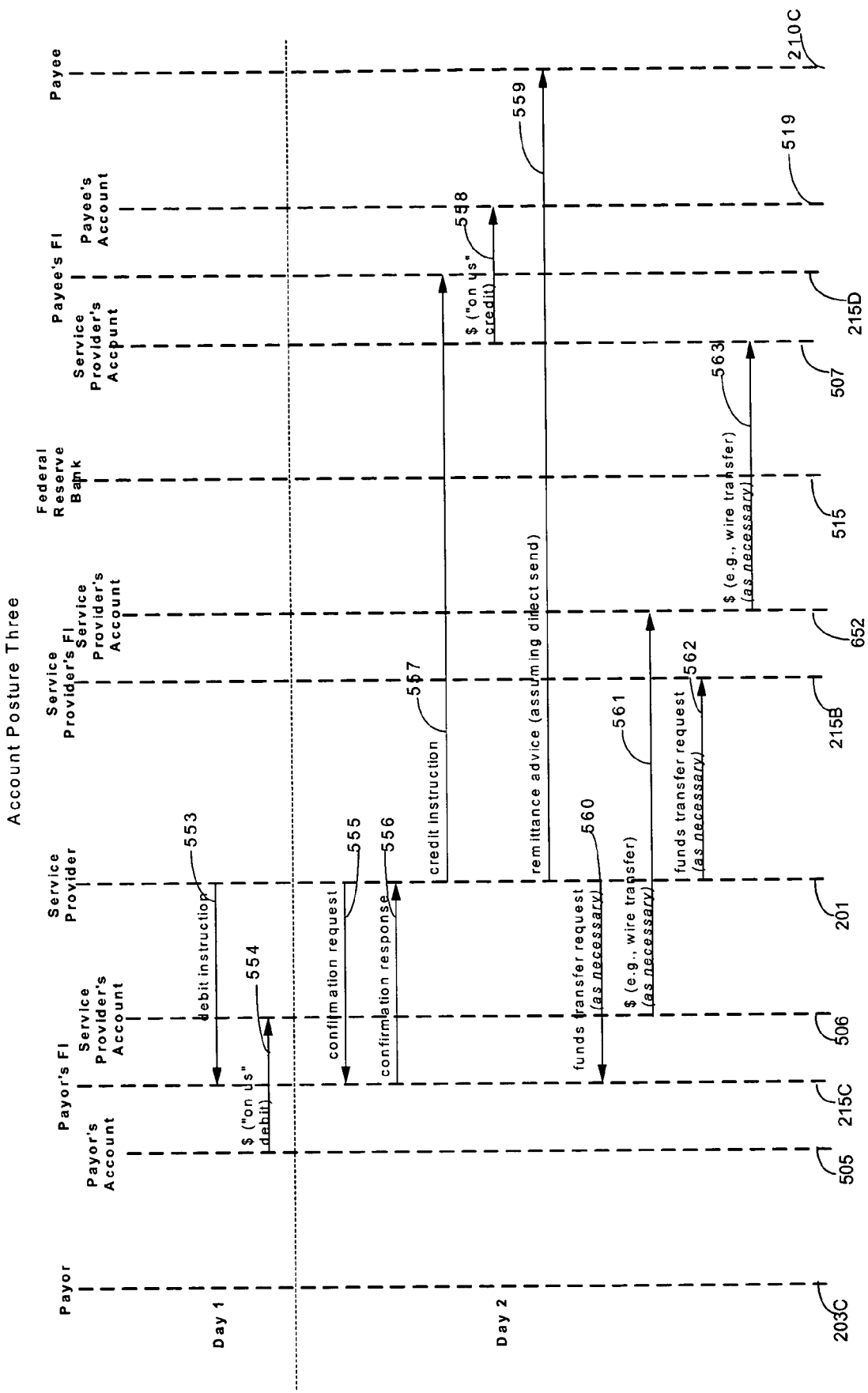
FIG. 5C is a third transition diagram showing an exemplary sequence of funds posting and associated information flows in accordance with the present invention.

FIG. 5C is a transition diagram that shows the sequence of funds posting and information flows after the processor 303 invokes account posture three processing at step 412 of FIG. 4. The time to payment in this account posture is again only two days.

Axis 203C represents a payor, in this example subscriber 203C. Axis 505 represents the payor's DDA maintained at financial institution 215C, which is represented by axis 215C. Axis 210C represents a payee. Axis 519 represents the payee's DDA maintained at financial institution 215D, which is represented by axis 215D. In account posture three, the service provider 201 is associated with DDAs at the payor's FI 215C, the payee's FI 215D, and its own primary FI, shown as FI 215B. Axis 506 represents the service provider's DDA at FI 215C. Axis 507 represents the service provider's DDA at FI 215D. Axis 652 represents the service provider's DDA at FI 215B.

On day 1 the processor 303 generates a debit instruction to debit the payor's DDA in favor of the service provider's DDA 506 at FI 215C. Communication 553 depicts the generated debit instruction being transmitted from the service provider 201 directly to the payor's FI 215C, preferably via network 206, at the direction of the processor 303. Because this is an "on us" transaction, detail 554 depicts funds moving from the payor's DDA 505 to the service provider's DDA 506 on day 1.

On day 2 the processor 303 generates a confirmation request and then causes a communication interface 315 to transmit the generated confirmation request to financial institution 215C via the network 206, communication 555. Communication 556 depicts a positive confirmation response being transmitted from financial institution 215C to the service provider 201 via the network 206. As above, one or both of communications 555 and 556 could, as desired, be via another network, or even manual.

After receipt of a positive confirmation response the processor 303 generates a credit instruction to credit the payee's DDA 519 from service provider DDA 507 maintained at FI 215D. The processor 303 causes a communication interface 315 to transmit the generated credit instruction to the FI 215D via network 206, communication 557. Optionally, a balance verification could be performed before transmitting the credit instruction to prevent overdrawing DDA 507.

Because this is another on us transaction, Detail 558 depicts funds moving from the service provider's DDA 507 to the payee's DDA 519 on day 2. Also on day 2 the processor 303 generates and causes a communication interface 315 to transmit remittance advice to the payee 210C via the network 206, communication 559. The payment request is now fulfilled. Of course, remittance advice could be, as desired, delivered differently.

As necessary, the processor 303 generates a funds transfer request to move funds from the service provider DDA 506 maintained at FI 215C to another service provider DDA, such as the service provider DDA 652 maintained at FI 215B. Thus, the service provider 201 can move the funds obtained from the payor's DDA 505 into another service provider DDA maintained at any FI 215A-215N. Communication 560 depicts the generated funds transfer request being transmitted from the service provider 201 to FI 215C at the direction of the processor 303. Detail 561 depicts funds moving from service provider DDA 506 to service provider DDA 652.

Also as necessary, the processor 303 generates a funds transfer request to move funds into the service provider DDA 507 maintained at FI 215D from another service provider DDA, such as DDA 652 maintained at FI 215B. Communication 562 depicts a generated funds transfer request being transmitted from the service provider 201 to FI 215B. Detail 563 depicts funds moving from service provider DDA 652 to service provider DDA 507. It should also be noted that, as the funds movement could be between any pair of service provider DDAs, the movement from of funds from service provider DDA 506 to service provider DDA 507 could have been accomplished via a single request and a single transfer, if the amount to be debited from DDA 506 was equal to the amount to be credited to DDA 507.

Figure 5D:
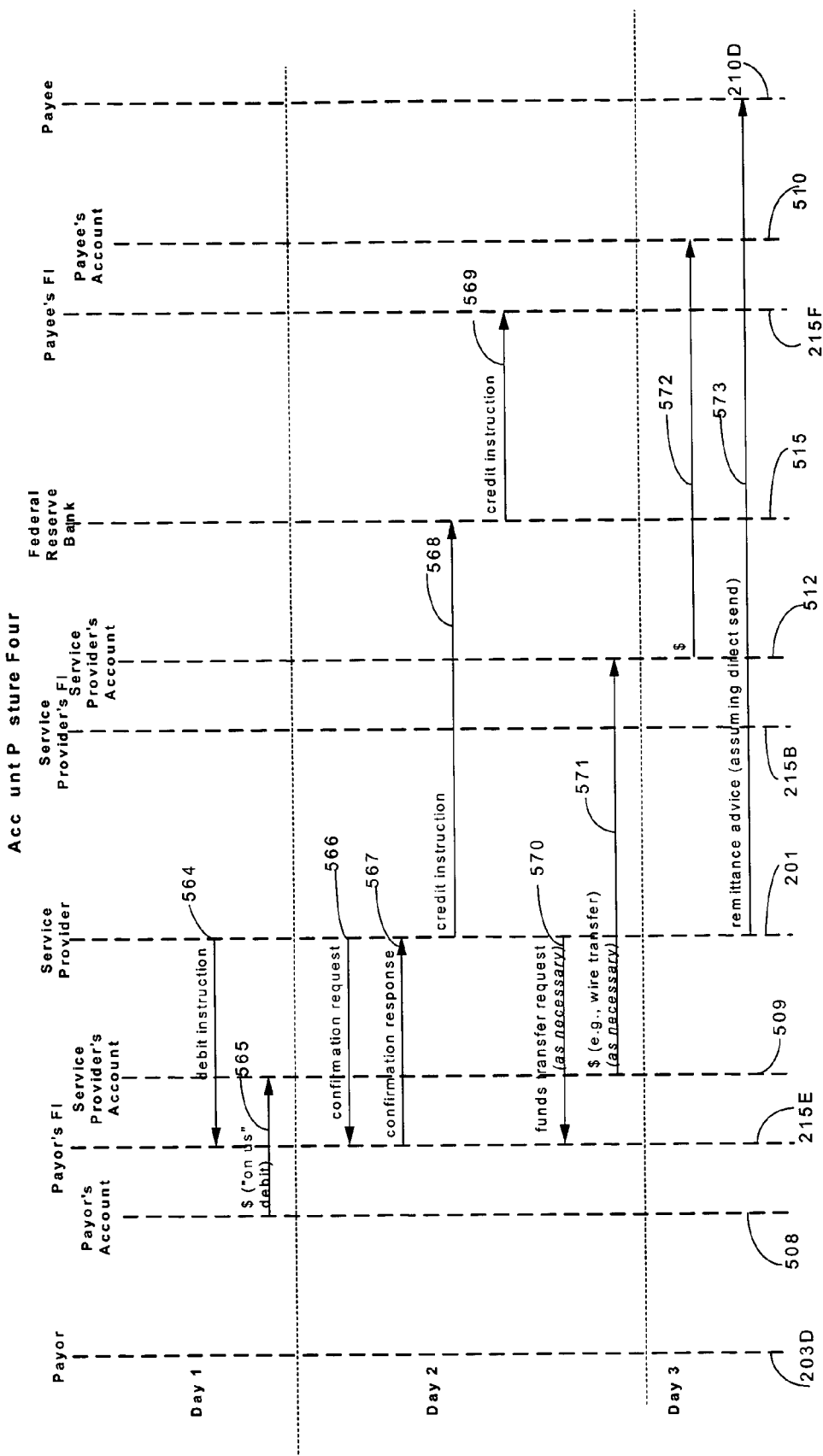
FIG. 5D is a fourth transition diagram showing an exemplary sequence of funds posting and associated information flows in accordance with the present invention.

FIG. 5D is a transition diagram that shows the sequence of funds posting and information flows after the processor 303 invokes account posture four processing at step 423 of FIG. 4. The time to payment in this account posture is three days.

Axis 203D represents a payor, in this example subscriber 203D. Axis 508 represents the payor's DDA maintained at financial institution 215E, which is represented by axis 215E. Axis 210D represents a payee. Axis 510 represents the payee's DDA maintained at financial institution 215F, which is represented by axis 215F. In account posture four, the service provider 201 is associated with a DDA at the payor's FI 215E, but not the payee's FI 215F. Axis 509 represents the service provider's DDA at FI 215E. In addition, the primary service provider DDA is represented by axis 512 at FI 215B.

On day 1 the processor 303 generates a debit instruction to debit the payor's DDA 508 in favor of service provider DDA 509. Communication 564 depicts the generated debit instruction being transmitted from the service provider 201 directly to the payor's FI 215E, at the direction of the processor 303, preferably via the network 206. Because this is an "on us" transaction, detail 565 depicts funds moving from the payor's DDA 508 to the service provider's DDA 509 on day 1.

On day 2 the processor 303 generates a confirmation request and then causes a communications interface 315 to transmit the generated confirmation request to financial institution 215E via the network 206, communication 566. Communication 567 depicts a positive confirmation response being transmitted from financial institution 215E to the service provider 201 via the network 206. As above, the confirmation request and response could be, as desired, performed differently.

After receipt of a positive confirmation response the processor 303 generates a credit instruction to credit the payee's DDA 510 from service provider DDA 512 maintained at FI 215B. The processor 303 causes a communication interface 315 to transmit the generated credit instruction to the Federal Reserve Bank via the ACH network, communication 568. The generated credit instruction is further transmitted to the payee's FI 215F via the ACH by the Federal Reserve Bank 515.

As necessary, the processor 303 generates and causes a communication interface 315 to transmit a funds transfer request to FI 215E via the network 206. Detail 571 depicts funds moving from the service provider DDA 509 to the service provider DDA 512.

On day 3 funds move from the service provider's DDA 512 to the payee's DDA 510, detail 572. Also on day 3 the processor 303 generates and causes a communications interface 315 to transmit remittance advice to the payee 210D via the network 206, communication 573. Of course, remittance advice could be delivered differently. The payment request is now fulfilled.

Figure 5E:
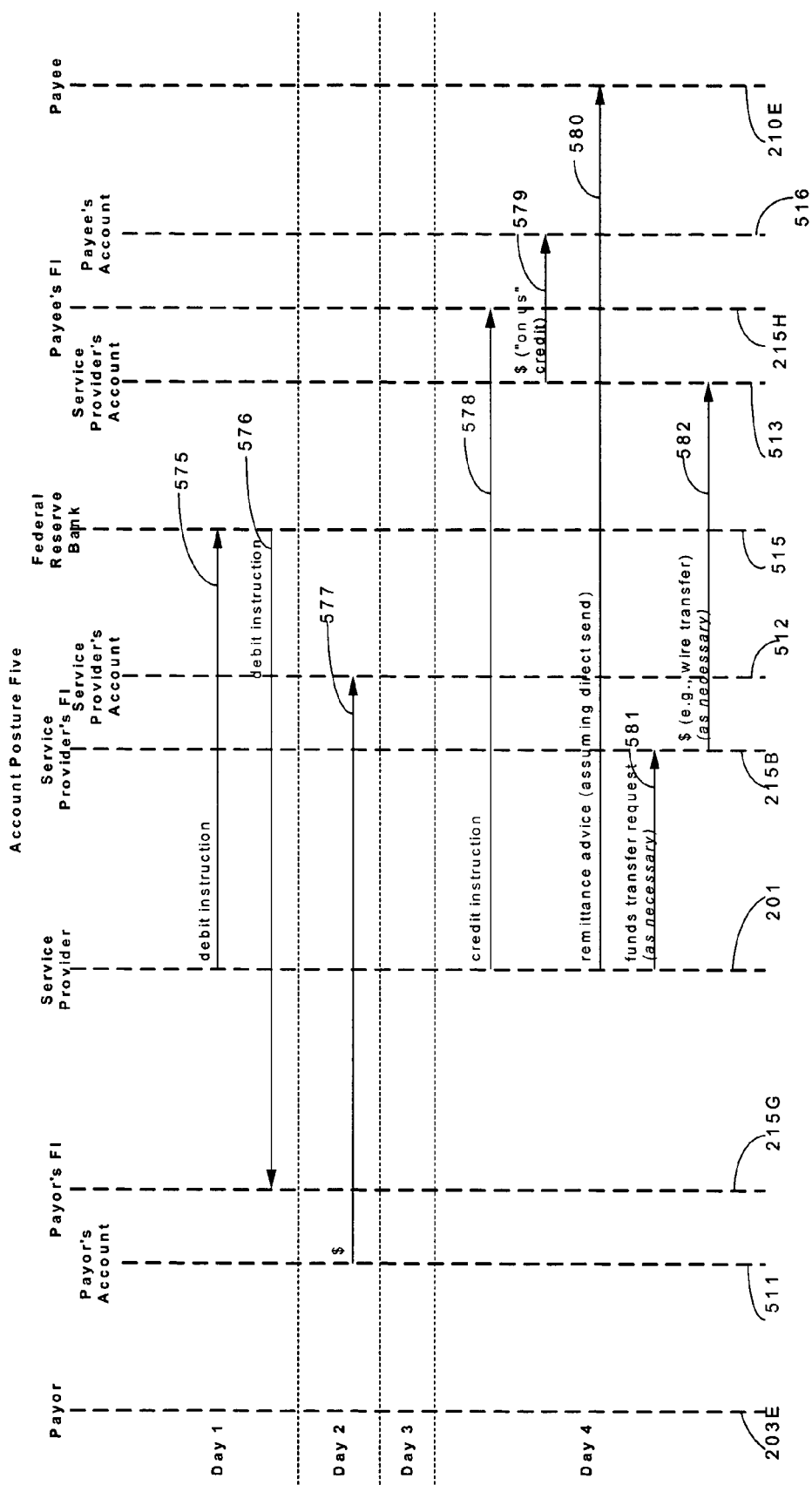
FIG. 5E is a fifth transition diagram showing an exemplary sequence of funds posting and associated information flows in accordance with the present invention.

FIG. 5E is a transition diagram that shows the sequence of funds posting and information flows after the processor 303 invokes account posture five processing at step 430 of FIG. 4. The time to payment in this account posture is four days.

Axis 203E represents a payor, in this example subscriber 203E. Axis 511 represents the payor's DDA maintained at financial institution 215G, which is represented by axis 215G. Axis 210E represents a payee. Axis 516 represents the payee's DDA maintained at financial institution 215H, which is represented by axis 215H. In account posture five, the service provider 201 is associated with a DDA at the payee's FI 215H, but not the payor's FI 215G. Axis 513 represents the service provider's DDA at FI 215H. In addition, the primary service provider DDA is represented by axis 512 at FI 215B.

On day 1 the processor 303 generates a debit instruction to debit the payor's DDA 511 in favor of service provider DDA 512. The processor 303 causes a communications interface 315 to transmit the generated debit instruction to the Federal Reserve Bank 515 via the ACH network, communication 575. The Federal Reserve Bank 515 further transmits the debit instruction to the payor's FI 215G via the ACH network, communication 576. Detail 577 depicts funds moving from the payor's DDA 511 to the service provider's DDA 512 on day 2.

After a three day hold period, on day 4 the processor 303 generates a credit instruction to credit the payee's DDA 516 from service provider DDA 513 maintained at FI 215H. The processor 303 causes a communication interface 315 to transmit the generated credit instruction to the FI 215H, preferably via network 206, communication 578.

Because this is another "on us" transaction, detail 579 depicts funds moving from the service provider DDA 513 to the payee DDA 516 on day 4. Also on day 4 the processor 303 generates and causes a communications interface 315 to transmit remittance advice to the payee 210E via the network 206, communication 580. Remittance advice could, as desired, be delivered differently. The payment request is now fulfilled.

As necessary, the processor 303 generates a funds transfer request to move funds from the service provider DDA 512 maintained at FI 215B to service provider DDA 513 maintained at FI 215H.

Figure 1:
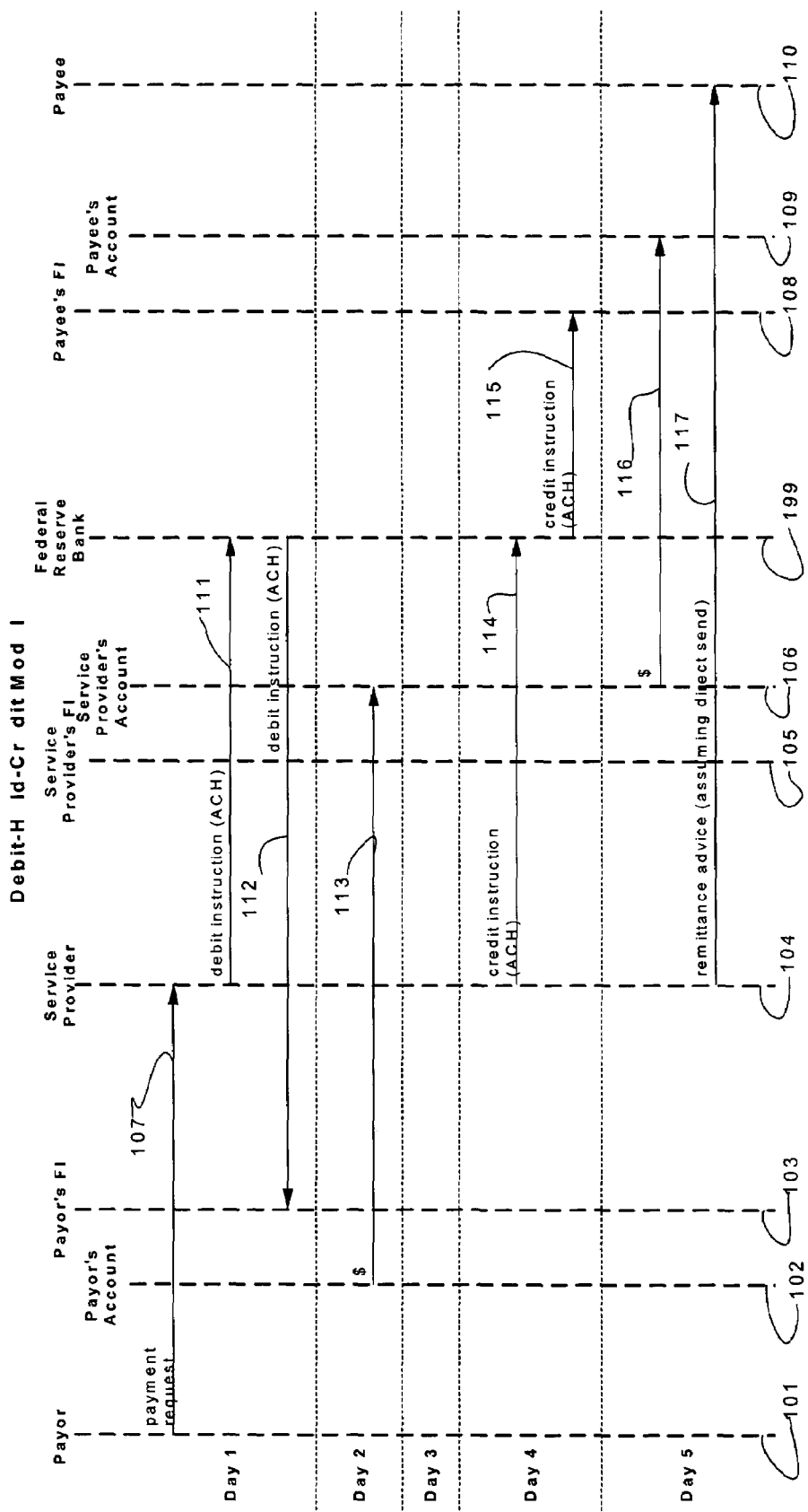
FIG. 1 is a transition diagram depicting the debit-hold-credit payment model in the prior art.

Account posture six, in which the service provider 201 is not associated with a DDA maintained at the payor's FI and is not associated with a DDA maintained at the payee's FI, is the same account posture described as in the debit-hold-credit model, described above. As such, account posture six processing, invoked at step 427, will not be described here, as it is the same described above and shown in FIG. 1.

It should be noted that a portion of the above-described processing can, as desired, be utilized when a payee is an unmanaged payee 213A-213N. In such situations, a service provider DDA is selected to receive debited funds based upon the location of the payor's DDA. The credit portion of the transition would be by check drawn on a service provider account.

Optimized Payment Method Selection

In this aspect of the invention an optimal combination of debit and credit methods for fulfilling a payment request in view of a particular prioritization between risk, cost, and speed is provided. Of course, other factors besides, and/or in addition to, risk, cost, and/or speed could be utilized, as desired. For each payment request, the service provider 201 determines an optimal method of debiting a payor and crediting a payee (managed payee 210A-210N or unmanaged payee 213A-213N) based upon variables associated with at least one of a payor, (subscriber 203A-203N), a payee, a payment amount, a CSP 207A-207N, a payor's DDA, a payee's DDA, and a service provider DDA. Other variables, as desired, may be utilized, instead of, or in addition to, these listed. These variables control one or more of risk processing methods utilized, form of debiting and/or crediting utilized, and service provider DDA, or DDAs, utilized. Of course, the variables can, as desired, control other aspects of payment processing.

In support of this aspect, the service provider 201 maintains metadata associated with each debiting option and each crediting option available to the service provider. FIGS. 6A and 6B are simplified depictions of exemplary debiting options metadata. FIG. 7 is a simplified depiction of exemplary crediting options metadata. The debiting options and the crediting options metadata is preferably stored in the data repository 310.

As seen in FIGS. 6A and 6B, metadata associated with debiting options, for each debiting option, includes an identifier 601, a brief description of the debiting option 603, an indicator as to whether a payment amount and/or payment volume risk analysis is required 605, an indicator as to whether a service provider DDA is required at a payor's FI 607, an indicator as to whether a service provider DDA is required at a payee's FI 609, an indicator as to whether payee reversibility, or equivalent guaranteed funds processing, is required 611, a risk factor level 613, a speed factor level 615, a cost factor level 617, credit options available 619, and a time delay, in days, as to when a credit can be initiated subsequent to initiating a debit 621. Risk, speed, and cost factor levels are determined by the service provider 201, preferably based upon experience and business needs. It should be noted that the brief description 603 is shown in FIGS. 6A and 6B for reader understanding and preferably is omitted. The brief descriptions may be likewise included in documentation.

As seen in FIG. 7, metadata associated with crediting options, for each crediting option, includes an identifier 701, a brief description of the crediting option 703, similar to the debiting option brief description 603, an indicator as to whether a service provider DDA is required at a payor's FI 707, an indicator as to whether a service provider DDA is required at a payee's FI 709, an indicator as to whether the payee's DDA and the payor's DDA must be maintained at a same FI 710, a speed factor level 715, a cost factor level 717, and an indicator as to when funds will be available to the payee subsequent to initiation of an electronic credit 720.

The data repository 310 also includes priority preference information used to select between debiting options and to select between crediting options. This information is an ordering of risk, cost, and speed. Priority preference information exists at a system (default) level, and may, dependent upon whether supplied by a CSP 307A-301N, exist at a CSP level, per consumer service provider 207A-207N. Also, for speed and cost only, priority preference information may exist at a payor level, per subscriber 203A-203N, dependent upon whether supplied by a subscriber 203A-203N.

Also, the data repository 310 preferably includes option modification information. Available debiting and crediting options can be modified at the CSP level and/or a product level. For example, a particular CSP could decide that, if a hold period is to be utilized for any given payment, it must always be a three day hold period, while another CSP could decide on a different hold period. Also for example, a person-to-person payment product could require a payee to be electronically creditable, thus eliminating check or draft as a debiting/crediting option. And, also for example, a businessto-business payment product could require a unique hold period different from that utilized in other payment products.

The managed payee database 310B, introduced above, includes, for each managed payee 210A-210N, an indicator as to a status of that managed payee 210A-210N as an electronic managed payee, and an indicator as to whether the service provider 201 has a reversibility agreement with that managed payee 210A-210N. Preferably, though not required, stored in association with reversibility agreement indicators are payee-established and service provider-established payee credit amount limits. A payee-established payee credit amount limit indicates the maximum amount per payment request for which the payee is willing to assume risk under a guaranteed funds, or reversibility, agreement. Such a payee reversibility agreement typically does not guarantee that funds are present in a payee's DDA to be recaptured in case of a failed payor debit. As a result, risk still exists, though payee-related risk instead of payor-related risk. The service provider 201 may then set a service provider-established payee credit amount limit based upon historical experience with a managed payee 210A-210N This limit indicates a maximum amount per payment request, different than the payee-established payee credit amount limit, the service provider is willing to issue as a reversible credit with no further risk processing. Of course, other factors can be utilized, as desired, to set payment credit amount limits.

Figure 8:
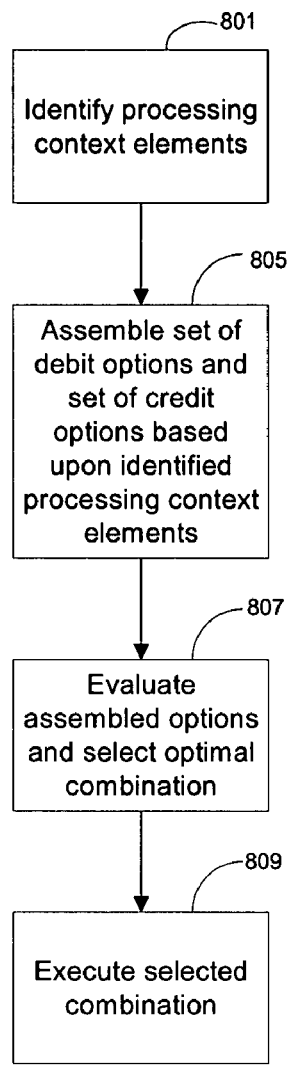
FIG. 8 is a simplified exemplary depiction of payment processing in accordance with the present invention.

FIG. 8 is a simplified depiction of payment processing in accordance with one aspect of the present invention. For any received payment request the service provider 201 first identifies the processing context elements, step 801. Identifying processing context elements is discussed further below and shown in FIG. 9.

Next, the service provider 201 assembles a set of available debit options and available credit options for the payment based upon the identified context elements, step 805. Assembly of debit and credit options is discussed further below and shown in FIGS. 10A and 10B. The service provider 201 then evaluates the assembled options and selects the optional combination, step 807. The evaluation and selection of step 807 will be discussed further below and shown in FIG. 11. Finally, the selection options are executed to debit the payor and credit the payee, step 809.

Figure 9:
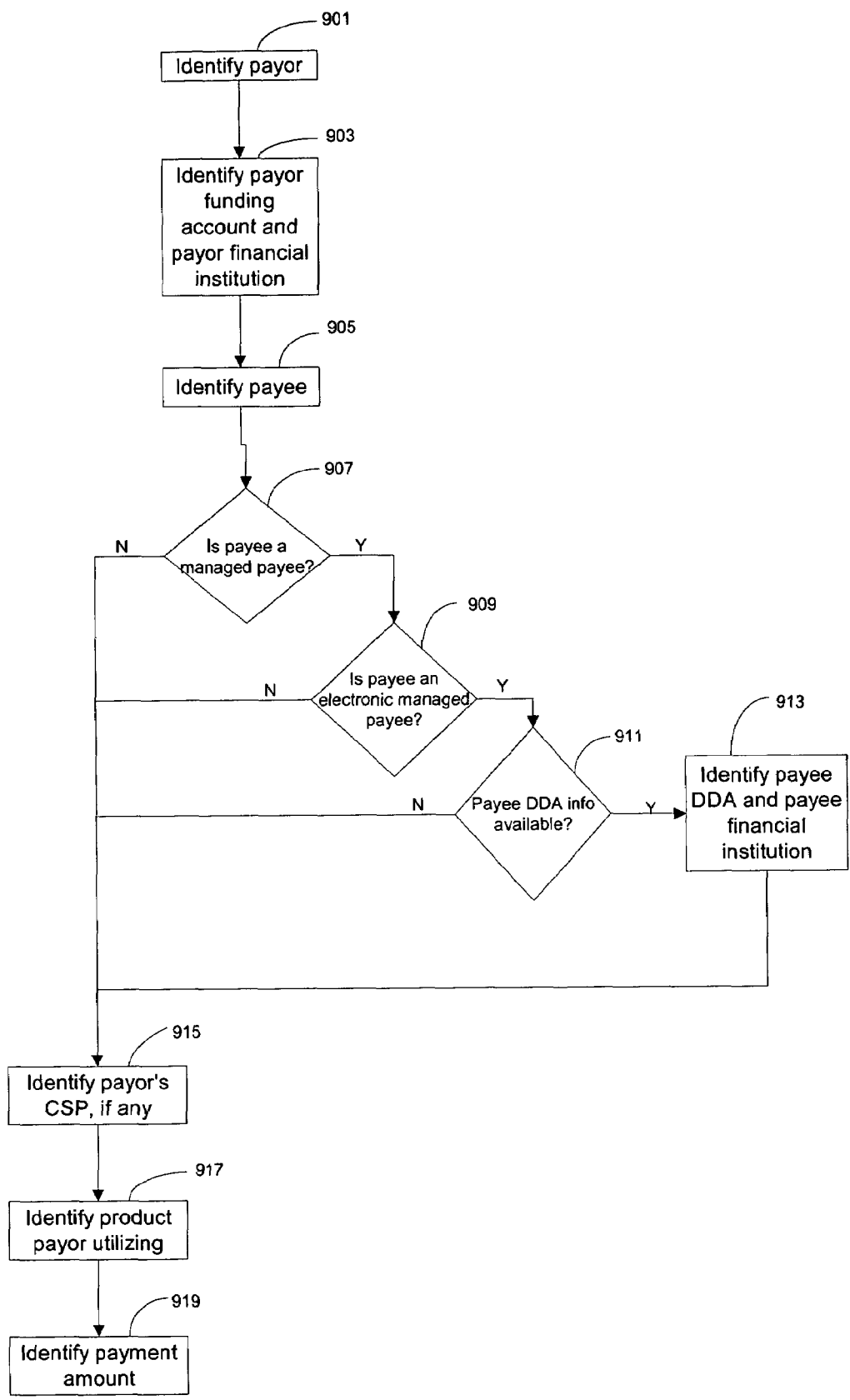
FIG. 9 is an exemplary depiction of the identification of processing context elements of FIG. 8 in accordance with the present invention.

Exemplary operations to identify processing context elements are shown in FIG. 9. However, identification of these elements could be closely coupled with use of each element in assembling the set of available debit options and available credit options. Also, the steps shown in FIG. 9 could be performed in a different order. After receipt of a payment request, via the network 206, and upon initiation of payment processing, a service provider processor 303 identifies the payor (subscriber 203A-203N) based upon the payment request, step 901. The payor can be, as desired, either explicitly or implicitly identified in the payment request. Based upon the received payment request, potentially also including accessing the subscriber profile database 310C, the processor 303 then identifies the payor's funding account (DDA account number) as well as the financial institution 215A-215N at which the DDA is maintained, step 903. A financial institution 215A-215N is identified based upon the routing number of the payor's FI 215A-215N, preferably stored in the subscriber profile database 310C.

At step 905, based upon the received payment request, the processor 303 identifies the payee. The payee can be, as desired, either explicitly or implicitly identified in the payment request. Next, the processor 303 determines if the payee is a managed payee 210A-210N, step 907. If not, operations continue with step 915, to be discussed below. The determination as to whether the payee is a managed payee is made by the processor 303 accessing the managed payee database 210B and determining if the identified payee is included therein. As desired, the determination could be made according to techniques disclosed in U.S. patent application Ser. No. 08/994,047, filed Dec. 19, 1997, entitled "An Electronic Bill Payment System with Merchant Identification", and assigned to the assignee of the present invention.

If the payee is determined to be a managed payee 210A-210N, at step 909 the processor 303 determines if the managed payee 210A-210N is an electronic managed payee. Information identifying whether a managed payee 210A-210N is an electronic managed payee is stored in the managed payee database 210B. If not operations continue with step 915. If so, operations continue with step 911 in which the processor 303 determines if DDA information for the electronic managed payee is included in the managed payee database 210B. As will be understood from the discussion above, some electronic managed payees do not provide DDA information. If not, operations continue with step 915. If so, operations continue with step 913 in which the processor 303 identifies the payee's DDA (DDA account number) and financial institution 214A-315N (routing number) from the managed payee database 210B.

At step 915 the processor 303 identifies a CSP 207A-207N, if any, with which the payor is associated. An association between a payor (subscriber 203A-203N) and a CSP 207A-207N could be, as desired, stored in the subscriber profile database 310C, or elsewhere. Further, such an association could be, as desired, either implicit or explicit in the received payment request.

At step 917 the processor 303 identifies the product the payor is utilizing. This could be implicit from the received payment request, or could be based upon information stored in the subscriber profile database 310C, or elsewhere. Finally, at step 919 the processor 303 identifies the payment amount, which is explicit in the payment request.

Figure 10A:
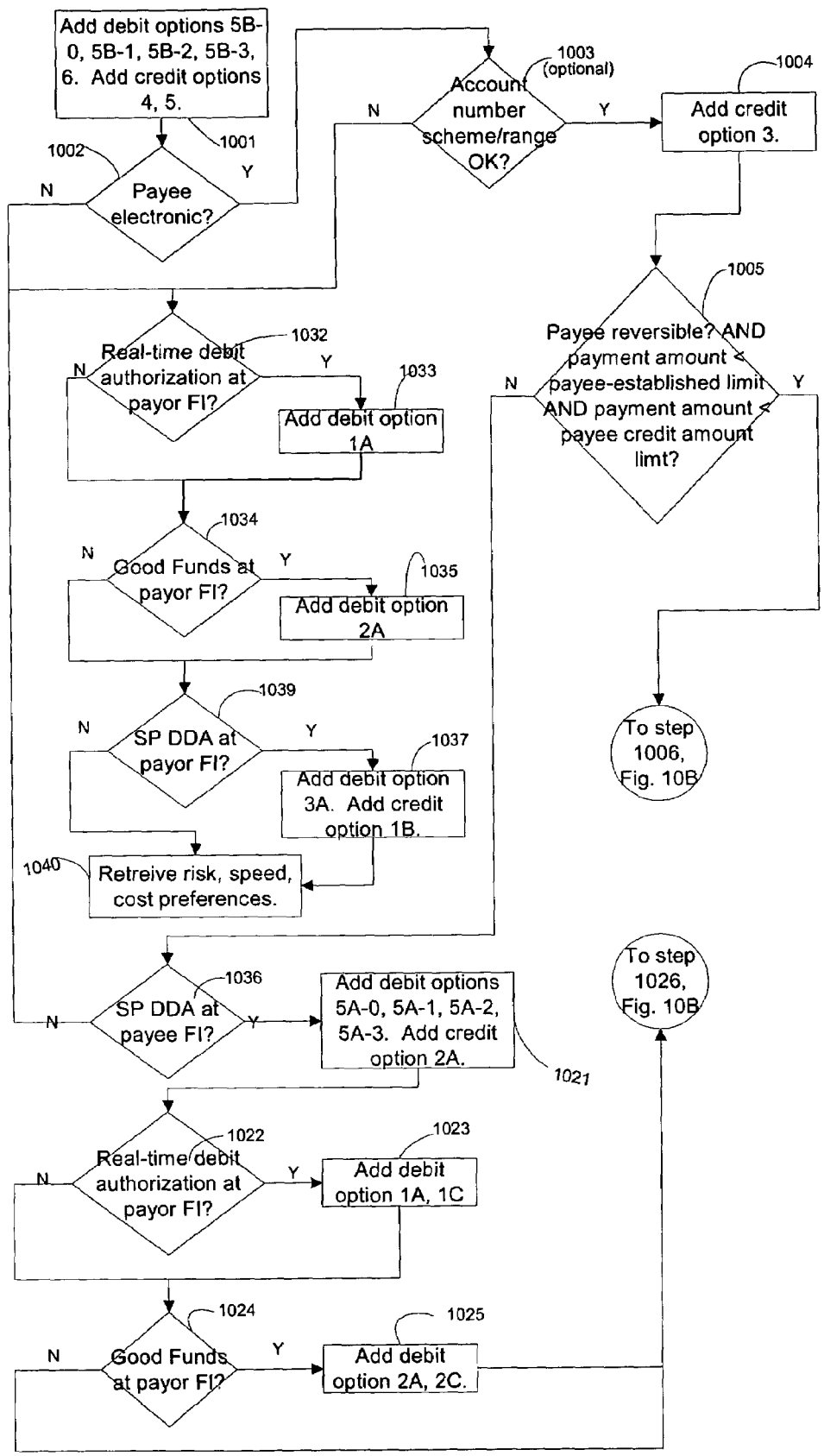
FIG. 10A is an exemplary depiction of the assembly of debit and credit options of FIG. 8 in accordance with the present invention.
Figure 10B:
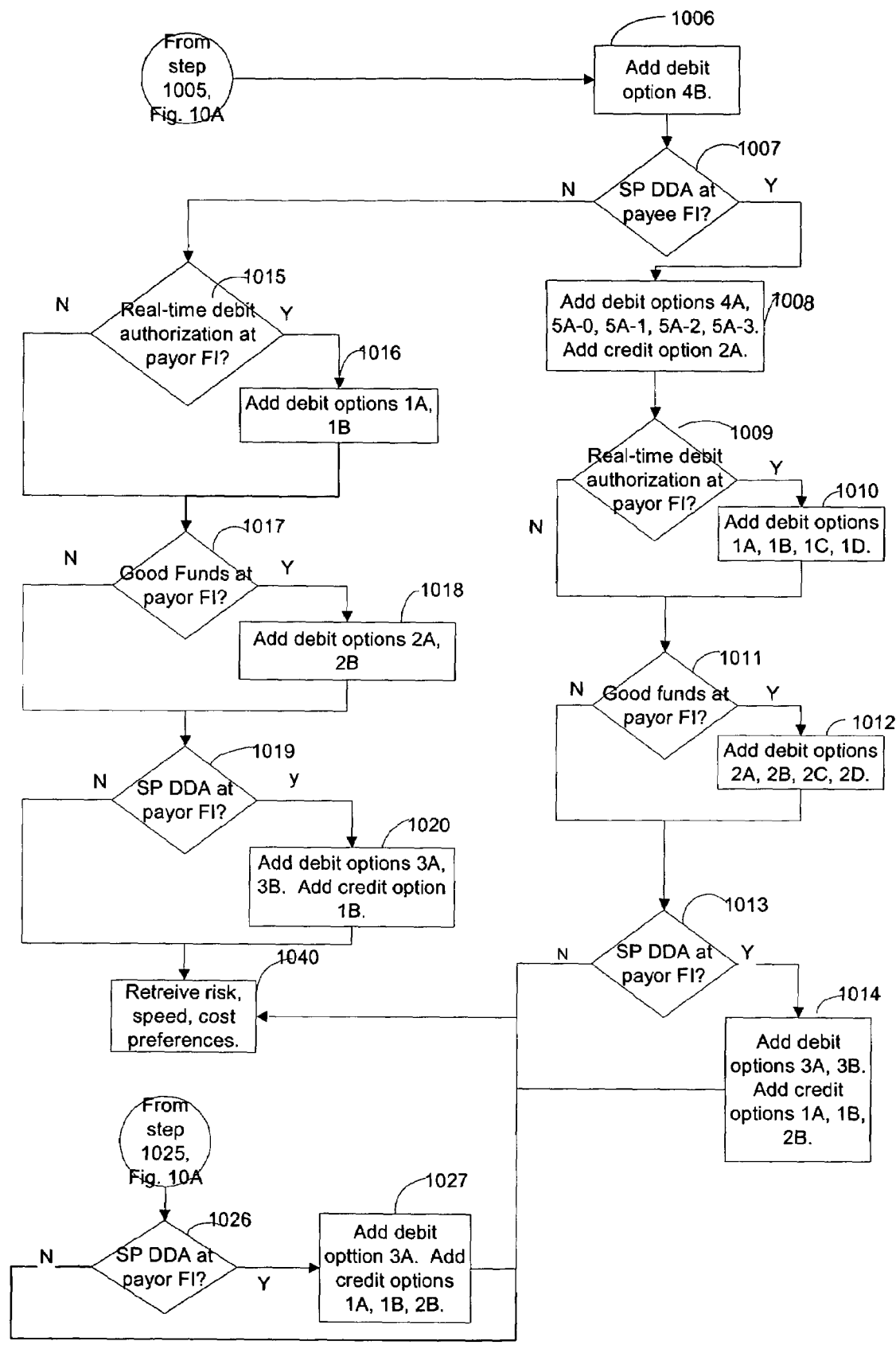
FIG. 10B is a further exemplary depiction of the assembly of debit and credit options of FIG. 8 in accordance with the present invention.

Exemplary operations to assemble the set of debit options and credit options of step 805 are depicted in FIGS. 10A and 10B. The operations of FIGS. 10A and 10B constrain, as necessary, the entire set of debit options and credit options shown in FIGS. 7A, 7B, and 8 available to the service provider 201 based upon product characteristics, CSP 207A-207N preferences, account locations, and/or system defaults.

At step 1001 a service provider processor 303 adds debit options 5B-0, 5B-1, 5B-2, 5B-3, and 6 to a list of available debit options for this payment irrespective of the identified processing context elements. Thus, for all payments, in this example, all these debit options are available. Also at step 1001 the processor 303 adds credit options 4 and 5 to a list of available credit options for this payment irrespective of the identified processing context elements. Thus, for all payments, in this example, all these credit options are available.

At step 1002 the processor 303, based upon results of the processing shown in FIG. 9, determines if the payee has been identified as an electronic managed payee. If so, operations continue with optional step 1003. If not, operations continue with step 1032. At optional step 1003 the processor 303 determines if the payor's account number with the payee conforms to an account scheme and/or range of account numbers of the payee. If this step is performed, it is based upon account scheme and/or range information stored in the managed payee database 210B. As desired, techniques disclosed in U.S. patent application Ser. No. 08/994,046, entitled "An Electronic Bill Payment System with Account Number Scheming", and/or U.S. Pat. No. 6,327,577, entitled "An Electronic Bill Payment System with Account Ranging", each filed Dec. 29, 1997 and each assigned to the assignee of the present invention, may be utilized in optional step 1003. If the account scheme and/or range conform, operations continue with step 1004 in which the processor 303 adds credit option 3 to the list of available credit options for this payment.

In step 1005, which follows step 1004, the processor 303 determines if a reversibility agreement exists with the payee, if the payment amount is less than any payee-established limit, and if the payment amount is less than any service provider-established payee credit amount limit. These determinations are made based upon information preferably stored in the managed payee database 210B, though some or all of the information could be stored elsewhere. If all three conditions are met, operations continue with step 1006, shown in FIG. 10B. If not, operations continue with step 1036, discussed further below.

At step 1006 the processor 303 adds debit option 4B to the list of available debit options for this payment. Next, at step 1007 the processor 303 determines if a service provider DDA is maintained at the financial institution 215A-215N at which the payee DDA is maintained. This determination is made based upon results of the processing of FIG. 9 and information stored in the service provider DDA database 310D. If so, operations continue with step 1008. If not, operations continue with step 1015, to be discussed further below.

At step 1008 the processor adds debit options 4A, 5A-0, 5A-1, 5A-2, and 5A-3 to this list of available debit options for this payment. Also, the processor 303 adds credit option 2A to the list of available credit options for this payment.

Next, at step 1009, the processor 303 determines if real-time debit authorization is available associated with the current payor's financial institution 215A-215N. This determination is made based upon results of the processing of FIG. 9 and information stored in the subscriber profile database 310C, or elsewhere. If so, operations continue with step 1010. If not operations continue with step 1011. At step 1010 the processor 303 adds debit options 1A, 1B, 1C, and 1D to the list of available debit options for this payment.

In step 1011, following either step 1009 or step 1010, the processor 303 determines if batch good funds debiting is available associated with the payor's financial institution 215A-215N. The determination is made based upon information stored in the subscriber profile database 310C, or elsewhere. If so operations continue with step 1012, if not, operations continue with step 1013.

At step 1012 the processor 303 adds debit options 2A, 2B, 2C, and 2D to the list of available debit options for this payment. Operations then continue with step 1013 in which the processor 303 determines if the service provider 201 is associated with a DDA maintained at the financial institution at which the payor's DDA is maintained. This determination is made based upon results of the processing depicted in FIG. 9 and information stored in the service provider DDA database 310D. If so, operations continue with step 1014. If not operations continue with step 1040, to be discussed further below. At step 1014 the processor 303 adds debit options 3A and 3B to the list of available debit options for this payment. Also, the processor 303 adds credit options 1A, 1B, and 2B to the list of available credit options for this payment. Operations continue with step 1050, to be discussed further below.

If in step 1007 the processor determines that a service provider DDA is not maintained at the payee's FI 215A-215N, operations continue with step 1015. At this step the processor 303 determines if real-time debit authorization is available in association with the current payor's financial institution 215A-215N, as disclosed above. If so, operations continue with step 1016. If not operations continue with step 1017.

At step 1016 the processor 303 adds debit options 1A and 1B to the list of available debit options for this payment. Operations continue with step 1017 in which the processor 303 determines if batch good funds debiting is available at the payor's FI 215A-215N, as discussed above. If not operations continue with step 1033. If so operations continue with step 1018 in which the processor 303 adds debit options 2A and 2B to the list of available debit options for this payment. Operations then continue with step 1019 in which the processor 303 determines if a service provider DDA is maintained at the payor's FI 215A-215N. If so, operations continue with step 1020. If not operations continue with step 1040, to be discussed further below. At step 1020 the processor adds debit options 3A and 3B to the list of available debit options for this payment and adds credit options 1B to the list of available credit options for this payment. Operations continue with step 1040, to be discussed further below.

If at step 1005 all three conditions are not met, operations continue with step 1036, in which the processor 303 determines if the service provider 201 maintains a DDA at the payee's FI 215A-215N. If not, operations continue with step 1032, to be discussed further below. If so, operations continue with step 1021 in which the processor 303 adds debit options 5A-0, 5A-1, 5A02 and 5A-3 to the list of available debit options for this payment. Also at step 1021 the processor 303 adds credit option 2A to the list of available credit options for this payment.

Following step 1021 the processor 303 determines if real-time debit authorization is available in association with the current payor's financial institution 215A-215N, step 1022. If not operations continue with step 1024. If so operations continue with step 1023 in which the processor 303 adds debit options 1A and 1C to the list of available debit options for this payment.

Operations then continue with step 1024 in which the processor 303 determines if batch good funds debiting is available at the payor's FI 215A-215N. If so, operations continue with step 1025. If not operations continue with step 1026.

At step 1025 the processor 303 adds debit options 2A and 2C to the list of available debit options for this payment. Operations then continue with step 1026.

At step 1026, shown in FIG. 10B, the processor 303 determines if the service provider 201 is associated with a DDA mentioned at the payors FI 215A-215N. If not, operations continue with step 1040, to be discussed further below. If so, operations continue with step 1027 in which the processor 303 adds debit option 3A to the list of available debit options for this payment. Also, the processor 303 adds credit options 1A, 1B and 2B to the list of available credit options for this payment. Operations continue with step 1040, to be discussed further below.

If at step 1002 it is determined that the payee is not electronic, if at optional step 1003 it is determined that the payor's account scheme and/or range does not conform, or if at step 1036 it is determined that a service provider DDA is not maintained at the payee's FI 215A-215N, operations continue with step 1032. At step 1032 the processor 303 determines if real-time debit authorization is available associated with the current payor's financial institution 215A-215N. If not operations continue with step 1034. If so operations continue with step 1033 in which the processor 303, adds debit option 1A to the list of available debit options for this payment. Operations continue with step 1034 following step 1033.

At step 1034 the processor 303 determines if batch good funds debiting is available at the payor's FI 215A-215N. If not, operations continue with step 1036. If so, operations continue with step 1035 in which the processor 303 adds debit option 2A to the list of available debit options for this payment. Operations continue with step 1039 following step 1035.

At step 1039 the processor 303 determines if the service provider 201 is associated with a DDA at the payor's FI 215A-215N. If not operations continue with step 1040. If so, operations continue with step 1037 in which the processor 303 adds debit option 3A to the available debit options list for this payment, and adds credit options 1B to the lists of available credit options for this payment. It should be noted that credit option 1B is not added if the results of optional step 1003 is negative. Likewise, credit option 1B is not added if the payee is not electronic. Operations continue with step 1040.

Following any of steps 1013, 1014, 1019, 1020, 1026, 1027, 1039, or 1037, the set of possible debit options and possible credit options for this payment have been assembled and operations continue with step 1040. At step 1040 the processor 303 retrieves stored risk, speed and cost preferences for the current payment. Introduced above, speed and cost preferences may be determined by the payor, service provider 201, or a CSP 207A-207N, whereas risk preference can only be determined by the service provider 201 or a CSP 207A-207N. The operations of step 805 of FIG. 8 are now completed.

Figure 11:
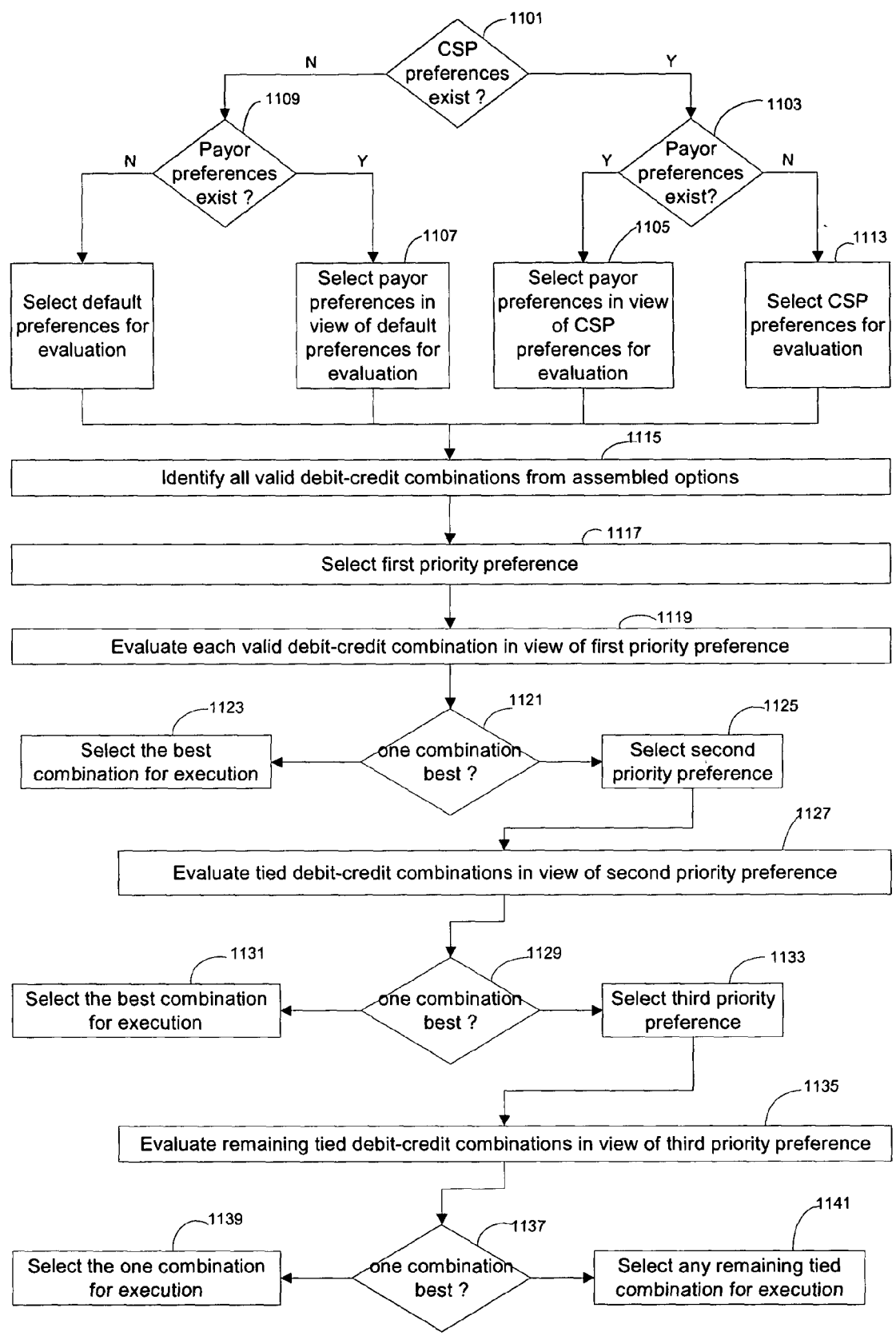
FIG. 11 is an exemplary depiction of the evaluation and selection of a debit and credit combination of FIG. 8 in accordance with the present invention.

FIG. 11 depicts exemplary operations performed in step 807 of FIG. 8 to evaluate the assembled options and select the optimal debit-credit combination. It should be stressed that the operations depicted in FIG. 11 are merely exemplary. Other operations to evaluate and select an optimal combination could, as desired, be performed. Additionally, the operations depicted in FIG. 11 could, as desired, be performed in a different order than that depicted in FIG. 11.

A service provider processor 303 first selects an ordering of priority preferences to utilize in the evaluation and selection. That is, an ordering of speed, risk, and cost preferences is determined. It should again be stressed that payor preferences cannot alter the ordering of risk, either as ordered by a CSP 207A-207N or the service provider 201. In particular, at step 1101 the processor 303 determines if any CSP preference ordering exists. This determination is made based upon if CSP preference information was retrieved at step 1040 of FIGS. 10A and 10B. If not, operations continue with step 1109. If so, operations continue with step 1103 in which the processor 303 determines if any payor preference ordering exists, based upon the information retrieved at step 1040. If payor preferences exist, operations continue with step 1105 in which the processor 303 selects the payor preferences, in view of the CSP preferences for use in the evaluation. That is, a CSP's ranking of risk is selected, and the payor's ranking of speed and cost is selected. If payor preferences do not exist, operations continue with step 1113 in which the processor 303 selects the CSP preferences for use in the evaluation.

If at step 1101 it is determined that CSP preferences do not exist operations continue with 1209 in which the processor 303 determines if payor preferences exist, based upon the information retrieved at step 1040. If so, at step 1107 the processor 303 selects the payor preferences, in view of default (system level) preferences, for use in evaluation. That is, the default ranking of risk is utilized, while payor ranking of speed and cost is utilized. If the determination at step 1109 is that payor preferences do not exist, the processor 303 selects default preferences for use in the evaluation, step 1111.

Following any of steps 1105, 1107, 1111, or 1113, operations continue with step 1115 in which the processor 303 identifies all valid debit-credit combinations for the set of assembled options. It will be recognized by one of ordinary skill in the art that not all debit options can be utilized with all credit combinations. The assembly of all valid debit-credit combinations is preferably based upon information included in the debiting options metadata (detail 619, FIGS. 6A and 6B).

Following identification of all valid debit-credit combinations from the assembled options, the processor 303 selects the first (highest) priority preference for evaluation, step 1117. Then, at step 1119 the processor 303 evaluates each valid debit-credit combination in view of the first priority preference utilizing the debit option and credit option metadata, shown in FIGS. 6A, 6B, and 7.

If the first priority preference is risk, the processor 303 accesses the debit option metadata, shown in FIGS. 6A and 6B and retrieves the risk factor for the debit option of each identified valid debit-credit combination. The processor 303 then orders the retrieved risk factors from lowest value to highest value. The debit-credit combination having the lowest value is identified as the most preferable, and the combination having the highest value is identified as the least preferable with the other ranked in ascending order.

If the first priority preference is cost or speed, the processor 303 accesses both the debit option and the credit option metadata and retrieves the appropriate factor (speed or cost) for both the debit option and the credit option of each identified valid debit-credit combination. The processor 303 sums the retrieved factors. The processor 303 then orders the summed factors from lowest value to highest value. The debit-credit combination having the lowest value is identified as the most preferably, and the combination having the highest value is identified as the least preferable, with the others ranked in ascending order.

At step 1121 the processor 303 determines if one of the evaluated combinations is the best. That is, a determination is made as to whether one combination has a value lower than the others. If so, operations continue with step 1123 in which the processor 303 selects this best combination for execution. If not, two or more of the combinations have the same value and operations continue with step 1125.

At step 1125 the processor 303 selects the second priority preference for evaluation. Then, at step 1127 the processor 303 evaluates the tied combinations in view of the second priority preference. This evaluation is the same as described above. That is, the processor 303 retrieves the appropriate factors, sums them as necessary, and orders them. At step 1129 the processor 303 determines if one combination is best (has lowest value). If so, operations continue with step 1131 in which the processor 303 selects the best combination (of the previously tied combinations) for execution.

If the second priority evaluation does not result in a best combination, operations continue with step 1133 in which the processor 303 selects the third priority preference for evaluation. At step 1135 the processor 303 evaluates the tied combinations resulting from the evaluation in view of the second priority. The evaluation of step 1135 will be understood from the evaluations described above. At step 1137 the processor 303 determines if one of these combinations is best (has lowest value). If so, operations continue with step 1139 in which the processor 303 selects the best combination (of the tied combinations from evaluation of the second priority preference) for execution. If not, the processor 303 selects any remaining tied combination for execution, step 1141 A variety of tie-breaking rules could be implemented at this stage, as desired.

Following any of steps 1123, 1131, 1139, or 1141, a service provider processor 303 executes a selected debit-credit combination to complete payment on behalf of the payor to the payee. Execution of the selected combination will be understood from the discussion herein.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A computer-implemented method comprising:
   storing, by a payment service provider in a database, for each of a plurality of payment processing debit options for debiting a payor account and for each of a plurality of payment processing credit options, a respective predetermined numeric value for each of a plurality of payment processing factors, wherein the plurality of payment processing factors comprise (i) a cost of processing factor and (ii) a speed of processing factor, wherein each respective value is a score relative to other debit or credit options;
   receiving, by the payment service provider, a payment request to pay a payee on behalf of a payor;
   determining, by the payment service provider based upon the payment request, applicable debit options from the plurality of payment processing debit options and applicable credit options from the plurality of payment processing credit options, wherein each of the applicable debit options and the applicable credit options is applicable to processing the payment request;
   selecting, by the payment service provider, one of the plurality of payment processing factors based on a preference;
   evaluating, by the payment service provider, each of a plurality of combinations of applicable debit options and applicable credit options, wherein the evaluation comprises determining a respective function of the values for the selected processing factor for each combination;
   determining, by the payment service provider, an optimal combination of one applicable debit option and one applicable credit option based at least in part on the evaluation; and
   directing payment in accordance with the optimal combination,
   wherein the above steps are performed by one or more computers associated with the payment service provider.

2. The method of claim 1, wherein the preference is associated with at least one of i) the payor, ii) a consumer service provider with which the payor is associated, or iii) the payment service provider.

3. The method of claim 1, further comprising:
   prior to selecting one of the plurality of payment processing factors based on a preference, determining the preference from a plurality of applicable preferences.

4. The method of claim 1, wherein the function comprises a sum of the respective values of the selected one of the plurality of payment processing factors for the applicable debit option and the applicable credit option for each combination of the plurality of combinations producing a respective total value for each combination, and wherein determining the optimal combination comprises selecting one of the plurality of combinations based on the respective total value for each combination.

5. The method of claim 4, wherein the function is a first function, the optimal combination is a first optimal combination the one applicable debit option is a first debit option, the one applicable credit option is a first credit option, and wherein determining the optimal combination further comprises:
   identifying a second optimal combination comprising a second debit option and a second credit option, wherein the total value of the first optimal combination equals the total value of the second optimal combination; and
   selecting the first combination based on evaluating a second function using the respective values of another of the plurality of payment processing factors for each of the first combination comprising the first debit option and the first credit option and the second combination comprising the second debit option and the second credit option.

6. The method of claim 1, wherein the one applicable debit option is one of i) a draft drawn on a deposit account associated with the payor, or ii) an electronic debiting of the deposit account associated with the payor.

7. The method of claim 1, wherein the one applicable credit option is one of i) a draft drawn on a deposit account associated with the payor, ii) a check drawn on a deposit account associated with the payment service provider, iii) an electronic funds transfer drawn on the deposit account associated with the payor, or iv) an electronic funds transfer drawn on the deposit account associated with the payment service provider.

8. The method of claim 1, further comprising:
   evaluating each of the applicable debit options based on a risk of processing factor,
   wherein determining an optimal combination of one applicable debit option and one applicable credit option comprises determining an optimal combination based at least in part on the risk evaluation.

9. A system comprising:
   a communications interface configured to receive a payment request to pay a payee on behalf of a payor; and
   a processor configured to:
   store, in a database, for each of a plurality of payment processing debit options for debiting a payor account and for each of a plurality of payment processing credit options, a respective predetermined numeric value for each of a plurality of payment processing factors, wherein the plurality of payment processing factors comprise (i) a cost of processing factor and (ii) a speed of processing factor,
   determine, based upon the payment request, applicable debit options from the plurality of payment processing debit options and applicable credit options from the plurality of payment processing credit options, wherein each of the applicable debit options and the applicable credit options are applicable to processing the payment request,
   select one of the plurality of payment processing factors based on a preference,
   evaluate each of a plurality of combinations of applicable debit options and applicable credit options, wherein the evaluation comprises determining a respective function of the values for the selected processing factor for each combination;
   determine an optimal combination of one applicable debit option and one applicable credit option based at least in part on the evaluation; and direct payment in accordance with the optimal combination of the one debit option and the one credit option.

10. The system of claim 9, wherein the preference is associated with at least one of i) the payor, ii) a consumer service provider with which the payor is associated, or iii) the payment service provider.

11. The system of claim 9, wherein the processor is further configured to, prior to selecting one of the plurality of payment processing factors based on a preference, determine the preference from a plurality of applicable preferences.

12. The system of claim 9, wherein the function comprises a sum of the respective values of the selected one of the plurality of payment processing factors for the applicable debit option and the applicable credit option for each combination of the plurality of combinations producing a respective total value for each combination, and wherein determining the optimal combination comprises selecting one of the plurality of combinations based on the respective total value for each combination.

13. The system of claim 12, wherein the function is a first function, the optimal combination is a first optimal combination, the one applicable debit option is a first debit option, the one applicable credit option is a first credit option, and wherein the processor is further configured to:
identify a second optimal combination comprising a second debit option and a second credit option, wherein the total value of the first optimal combination equals the total value of the second optimal combination, and
select the first combination based on evaluating a second function using the respective values of another of the plurality of payment processing factors for each of the first combination comprising the first debit option and the first credit option and the second combination comprising the second debit option and the second credit option.

14. The system of claim 9, wherein the one applicable debit option is one of i) a draft drawn on a deposit account associated with the payor, or ii) an electronic debiting of the deposit account associated with the payor.

15. The system of claim 9, wherein
the one applicable credit option is one of i) a draft drawn on a deposit account associated with the payor, ii) a check drawn on a deposit account associated with the payment service provider iii) an electronic funds transfer drawn on a deposit account associated with the payor, or iv) an electronic funds transfer drawn on the deposit account associated with the payment service provider.

16. The system of claim 9, wherein the processor is further configured to evaluate each of the applicable debit options based on a risk of processing factor and to determine an optimal combination of one applicable debit option and one applicable credit option based at least in part on the risk evaluation.

* * * * *

UNITED STATES PATENT AND TRADEMARK OFFICE
CERTIFICATE OF CORRECTION

PATENT NO. : 7,653,598 B1  Page 1 of 1
APPLICATION NO. : 10/631973
DATED : January 26, 2010
INVENTOR(S) : Hamilton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1438 days.

Signed and Sealed this

Twenty-eighth Day of December, 2010

David J. Kappos
*Director of the United States Patent and Trademark Office*